US012666407B2

(12) United States Patent
Liu et al.

(10) Patent No.: US 12,666,407 B2
(45) Date of Patent: Jun. 23, 2026

(54) DECOUPLED MINI-SLOT SIDELINK CONTROL INFORMATION (SCI) FOR SCHEDULING AND RESOURCE RESERVATION

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Junyi Li, Fairless Hills, PA (US); Xiaoxia Zhang, San Diego, CA (US); Luanxia Yang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 18/580,135

(22) PCT Filed: Sep. 16, 2021

(86) PCT No.: PCT/CN2021/118670
§ 371 (c)(1),
(2) Date: Jan. 17, 2024

(87) PCT Pub. No.: WO2023/039783
PCT Pub. Date: Mar. 23, 2023

(65) Prior Publication Data
US 2024/0340865 A1     Oct. 10, 2024

(51) Int. Cl.
*H04W 72/25* (2023.01)
*H04W 72/0446* (2023.01)

(52) U.S. Cl.
CPC ....... *H04W 72/0446* (2013.01); *H04W 72/25* (2023.01)

(58) Field of Classification Search
CPC ... H04W 72/0446; H04W 72/25; H04W 4/40; H04W 72/20; H04W 76/14; H04W 72/02
See application file for complete search history.

(56) References Cited

U.S. PATENT DOCUMENTS

2021/0127361 A1      4/2021   Yasukawa et al.
2021/0219268 A1 *    7/2021   Li ......................... H04W 72/02
(Continued)

FOREIGN PATENT DOCUMENTS

EP          3962219 A1 *   3/2022   ............ H04W 72/20
WO      2020033704 A1      2/2020

OTHER PUBLICATIONS

International Search Report and Written Opinion—PCT/CN2021/118670—ISA/EPO—Mar. 23, 2022.
(Continued)

*Primary Examiner* — Thai Nguyen
(74) *Attorney, Agent, or Firm* — Qualcomm Incorporated/Seyfarth Shaw LLP

(57) ABSTRACT

A method of wireless communication, by a user equipment (UE), includes selecting a resource from a dedicated physical sidelink control channel (PSCCH) resource pool that has multiple potential PSCCH time domain resources with a mini-slot structure. The method also includes transmitting a mini-slot first stage sidelink control information (SCI-1) message on the selected resource. The mini-slot SCI-1 message is decoupled from a physical sidelink shared channel (PSSCH) associated with a data resource pool.

28 Claims, 13 Drawing Sheets

(56)　　　　　　References Cited

U.S. PATENT DOCUMENTS

| | | | |
|---|---|---|---|
| 2021/0227604 A1* | 7/2021 | Huang | ............... H04W 40/248 |
| 2021/0250159 A1* | 8/2021 | Su | ............................ H04L 5/26 |
| 2022/0182994 A1* | 6/2022 | Yoshioka | ............. H04W 72/20 |
| 2022/0377722 A1* | 11/2022 | Yao | ....................... H04L 5/0055 |

OTHER PUBLICATIONS

NEC: "Resource Pool Design for V2X", 3GPP TSG RAN WG1 Meeting #86, R1-166645, 3rd Generation Partnership Project, Mobile Competence Centre, 650, Route Des Lucioles, F-06921 Sophia Antipolis Cedex, France, vol. RAN WG1, No. Gothenburg, Sweden, Aug. 22, 2016-Aug. 26, 2016, Aug. 12, 2016, 3 Pages, XP051141895, Section 3.

* cited by examiner

1400

SELECT A RESOURCE FROM A DEDICATED PHYSICAL SIDELINK CONTROL CHANNEL (PSCCH) RESOURCE POOL HAVING MULTIPLE POTENTIAL PSCCH TIME DOMAIN RESOURCES WITH A MINI-SLOT STRUCTURE ⌐1402

TRANSMIT A MINI-SLOT FIRST STAGE SIDELINK CONTROL INFORMATION (SCI-1) MESSAGE ON THE SELECTED RESOURCE, THE MINI-SLOT SCI-1 MESSAGE DECOUPLED FROM A PHYSICAL SIDELINK SHARED CHANNEL (PSSCH) ASSOCIATED WITH A DATA RESOURCE POOL ⌐1404

*FIG. 14*

DECOUPLED MINI-SLOT SIDELINK CONTROL INFORMATION (SCI) FOR SCHEDULING AND RESOURCE RESERVATION

FIELD OF THE DISCLOSURE

The present disclosure relates generally to wireless communications, and more specifically to decoupled mini-slot first stage sidelink control information (SCI-1) for scheduling and resource reservation.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. Narrowband (NB)-Internet of things (IoT) and enhanced machine-type communications (eMTC) are a set of enhancements to LTE for machine type communications. There exists a need for further improvements in 5G NR technology. These improvements may also be applicable to other multi-access technologies and the telecommunications standards that employ these technologies.

Wireless communications systems may include or provide support for various types of communications systems, such as vehicle related cellular communications systems (e.g., cellular vehicle-to-everything (CV2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink user equipment (UEs), such as vehicles, may communicate directly with each other using device-to-device (D2D) communications over a D2D wireless link. These communications can be referred to as sidelink communications.

As the demands for sidelink communications increase in general, and CV2X technology specifically penetrates the market and the number of cars supporting CV2X communinication grows rapidly, the CV2X network is expected to become increasingly crowded, especially for peak traffic scenarios. As a result, the chance of colliding allocations between UEs may increase. An allocation collision may prevent successful decoding of at least one of the colliding UE transmissions and in some cases may prevent all of the colliding UE transmissions from being decoded. For safety reasons, there is a need to minimize the duration of repetitive collisions between semi-persistently scheduled allocations of colliding UEs or to minimize the number of future collisions in general.

SUMMARY

In some aspects of the present disclosure, a method of wireless communication, by a user equipment (UE), includes selecting a resource from a dedicated physical sidelink control channel (PSCCH) resource pool having multiple potential PSCCH time domain resources with a mini-slot structure. The method further includes transmitting a mini-slot first stage sidelink control information (SCI-1) message on the selected resource. The mini-slot SCI-1 message is decoupled from a physical sidelink shared channel (PSSCH) associated with a data resource pool.

Other aspects of the present disclosure are directed to an apparatus for wireless communication, by a user equipment (UE) having a memory and one or more processors coupled to the memory. The processor(s) is configured to select a resource from a dedicated physical sidelink control channel (PSCCH) resource pool that has multiple potential PSCCH time domain resources with a mini-slot structure. The processor(s) is further configured to transmit a mini-slot first stage sidelink control information (SCI-1) message on the selected resource. The mini-slot SCI-1 message is decoupled from a physical sidelink shared channel (PSSCH) associated with a data resource pool.

In aspects of the present disclosure, an apparatus for wireless communication, by a user equipment (UE), includes means for selecting a resource from a dedicated physical sidelink control channel (PSCCH) resource pool having multiple potential PSCCH time domain resources with a mini-slot structure. The apparatus further includes means for transmitting a mini-slot first stage sidelink control information (SCI-1) message on the selected resource. The mini-slot SCI-1 message is decoupled from a physical sidelink shared channel (PSSCH) associated with a data resource pool.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 14 is a flow diagram illustrating an example process performed, for example, by a user equipment, in accordance with various aspects of the present disclosure.

DETAILED DESCRIPTION

Figure 1:
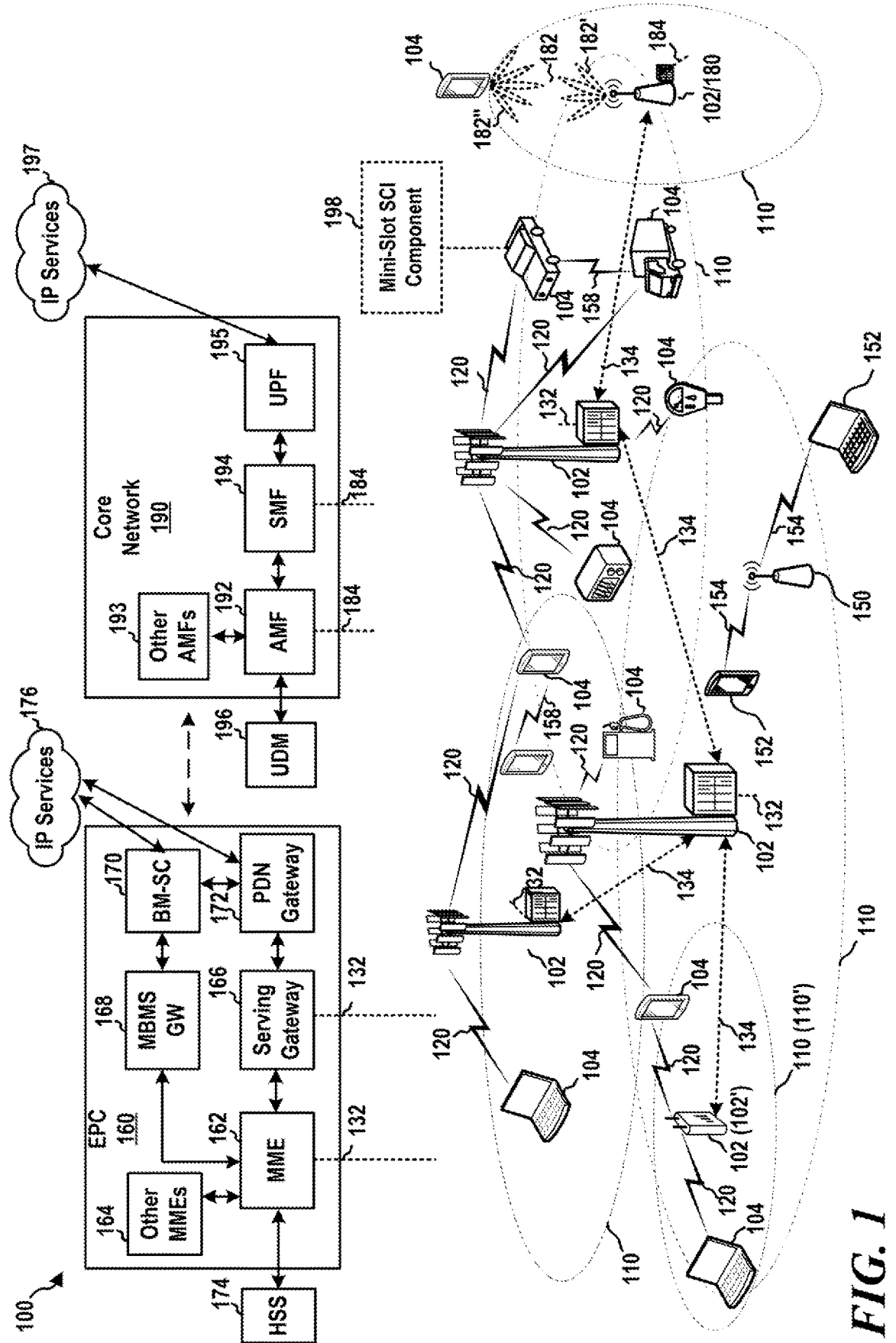
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

Sidelink (SL) communications refers to the communications among user equipment (UE) without tunneling through a base station and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a base station and a UE. For instance, the PSCCH may carry sidelink control information (SCI) and the PSCCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communications may include, among others, vehicle-to-everything (V2X), industrial IoT (IIoT), and/or NR-lite.

In a sidelink network deployment with ultra-reliable low latency communications (URLLC) traffic, such as with industrial internet of things (IIoT) devices, channel sensing with a sidelink control information (SCI) resource reservation for retransmission is a bottleneck for sidelink mode-2 operation. The bottleneck may prevent the devices from achieving latency specifications. In the 3GPP Release 16 design, one or more non-target transmitters may transmit on a target transmitter's reserved resources for critical retransmission, as the non-target transmitters may not hear first stage SCI (SCI-1) reservations from the target transmitter due to half duplex limitations. Half duplex devices may either transmit or receive at one time, but not simultaneously transmit and receive at the same time. Therefore, a half duplex transmitting device would not receive (e.g., hear) any messages while transmitting. As an example, the half duplex transmitting device may not receive a target transmitter's reservation messages, even though the messages are frequency division multiplexed. In this example, the half duplex transmitting device may perform a transmission in a reserved resource indicated in the target transmitter's reservation messages because the half duplex transmitting device did not receive the reservation messages. The reservation messages may be associated with a retransmission by the target transmitter. In the current example, the retransmission by the target transmitter may collide with the transmission of the half duplex transmitting device performed in the reserved resource indicated in the target transmitter's reservation messages. Due to the collision, the target transmitter cannot succeed in the retransmission in the reserved resource. As such, a packet delay budget (PDB) may not be satisfied.

According to aspects of the present disclosure, a new SCI-1 design enables time division multiplexed scheduling of multiple SCI-1 messages in subchannels of a same slot. The new SCI-1 design may assist the half duplex sidelink transmitter with obtaining the other transmitter's resource reservations if the scheduled sub channels do not collide. Additionally, the new SCI-1 design may prevent collisions on critical retransmissions from the target transmitter.

Aspects of the present disclosure define a dedicated resource pool for physical sidelink control channel (PSCCH) transmission, particularly SCI-1 transmission. The resource pool may contain multiple PSCCHs in time domain with a mini-slot structure. According to aspects of the present disclosure, a decoupled PSCCH (e.g., SCI-1) may schedule the physical sidelink shared channel (PSSCH) in a legacy resource pool. For example, each SCI-1 may map to a second stage SCI (SCI-2) and PSSCH in a different slot and subchannel. The SCI-1s are from the dedicated PSCCH resource pool, whereas the SCI-2 and PSSCH are from a data or legacy resource pool. Transmitting SCI-1s for different subchannels within a single slot having a mini-slot structure reduces the chance that transmitters cannot hear each other's future resource reservation due to half duplex limitations.

If the network supports legacy UEs in the legacy resource pool, a legacy SCI-1 may be retained with consistent content as in the new SCI-1 in the dedicated PSCCH resource pool. Thus, legacy UEs can receive the same information without reading the new SCI-1. In a greenfield deployment (e.g., without legacy UEs), the legacy PSCCH can be eliminated in front of the PSSCH. The UEs may rely on the mini-slot SCI-1 for channel sensing. In other aspects, the new UEs may perform channel sensing based on mini-slot SCI-1 messages in the mini-slot control resource pool. Reading the mini-slot SCI-1 message is sufficient to handle the reservation and collision from the new UEs. In a mixed deployment, additional second stage sensing occurs based on the legacy SCI-1 message in the data resource pool. The second stage sensing helps to resolve reservations and collisions from the legacy UEs.

In aspects where the control mini-slot resource pool (RP) and data resource pool (RP) are frequency division multiplexed, the control mini-slot resource pool (RP) and data resource pool may correspond to different component carriers. For example, the control mini-slot resource pool may occupy a low band and the data resource pool may occupy a high band. The SCI-1 in the low band mini-slot control resource pool may include a transmission configuration indicator (TCI) state of a scheduled PSSCH and a beam reservation for future reserved resources.

Aspects of the present disclosure relate to mapping a dedicated PSCCH resource pool to a data resource pool. In some aspects, mini-slots in the dedicated PSCCH resource pool map to different data subchannels in the data resource pool. There may be a one-to-one mapping from SCI-1 mini-slots to subchannels. Mini-slot SCI-1 mapping to different data subchannels in the same slot may be time division multiplexed within the dedicated PSCCH resource pool. Thus, transmitters have a higher chance of hearing one another, assuming they are not colliding on the same resource (e.g., subchannel). An SCI-1 mini-slot resource index where the SCI-1 is detected may determine a starting subchannel of the PSSCH in the data resource pool. For example, the first mini-slot may correspond to the first subchannel. The number of subchannels may be signaled in the mini-slot SCI-1.

According to aspects of the present disclosure, a new format is presented for the decoupled SCI-1 and PSSCH design. The mini-slot SCI-1 may include additional fields for a layer one (L1) source identifier (ID), an L1 destination ID, a TCI state, and a slot offset (K0). The TCI state may help with low band/high band operation. The SCI-1 is decoupled from the PSSCH. In other words, they are in different slots and possibly in different carriers. As a result, it is beneficial for the receiver to know if the PSSCH is intended for itself. The L1 destination ID may help the receiver determine whether to decode the PSSCH in the data resource pool. The L1 source ID may help with determining the physical sidelink feedback channel (PSFCH) resource. For example, the transmitter and receiver may perform hand shaking before actual PSSCH transmission via the mini-slot PSFCH to avoid collision. The TCI state in the SCI-1 indicates the PSSCH beam. For example, the SCI-1 and PSSCH may be transmitted with different beams. The slot offset (K0) from the mini-slot SCI-1 to the scheduled PSSCH may optionally be included in the SCI-1 message.

A dedicated PSCCH resource pool may accommodate repetitive resource reservation SCI-1 messages. The transmitter may repeat the legacy SCI-1 in a dedicated mini-slot resource pool to solve possible collisions in the future reserved resources due to the half duplex deafness problem. The repetitive resource reservation SCI-1 design may improve the robustness of future resource reservations.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit and receive point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, a UE 104 may include a mini-slot sidelink control information (SCI) component 198 configured to select a resource from a dedicated physical sidelink control channel (PSCCH) resource pool having a first set of potential PSCCH time domain resources with a mini-slot structure. The mini-slot SCI component 198 is also configured to transmit a mini-slot first stage SCI (SCI-1) message on the selected resource. The mini-slot SCI-1 message is decoupled from a physical sidelink shared channel (PSSCH) associated with a data resource pool.

Although the following description may be focused on 5G NR, it may be applicable to other similar areas, such as LTE, LTE-A, CDMA, GSM, and other wireless technologies.

Figures 2A, 2B, 2C, 2D:
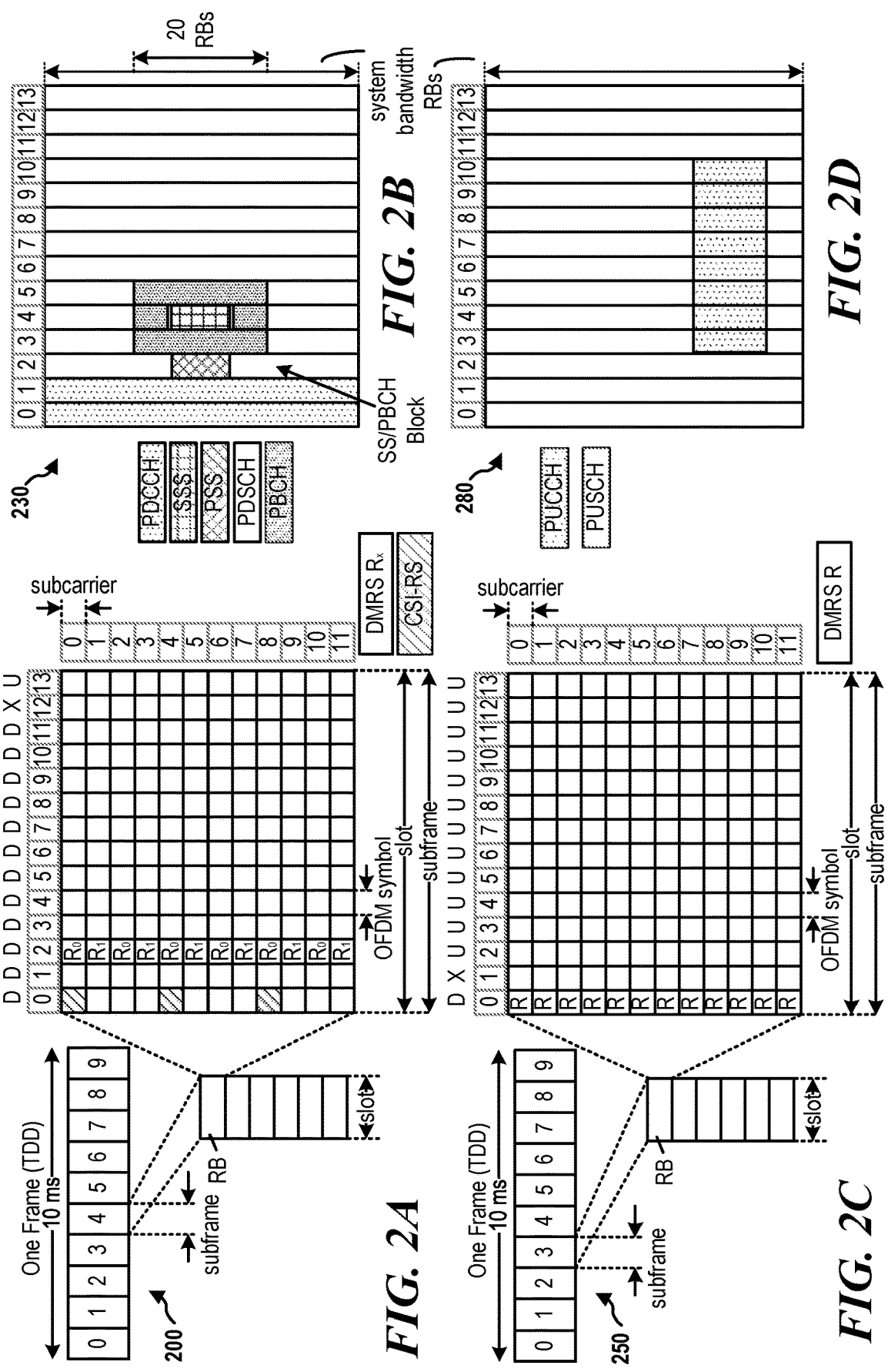
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2μ slots/subframe. The subcarrier spacing and symbol length/duration are a function of the numerology. The subcarrier spacing may be equal to 2^μ*15 kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as Rx for one particular configuration, where 100× is the port number, but other DM-S configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment/negative acknowledgment (ACK/NACK) feedback. The PUSCH carries data, and may additionally be used to carry a buffer status report (BSR), a power headroom report (PHR), and/or UCI.

Figure 3:
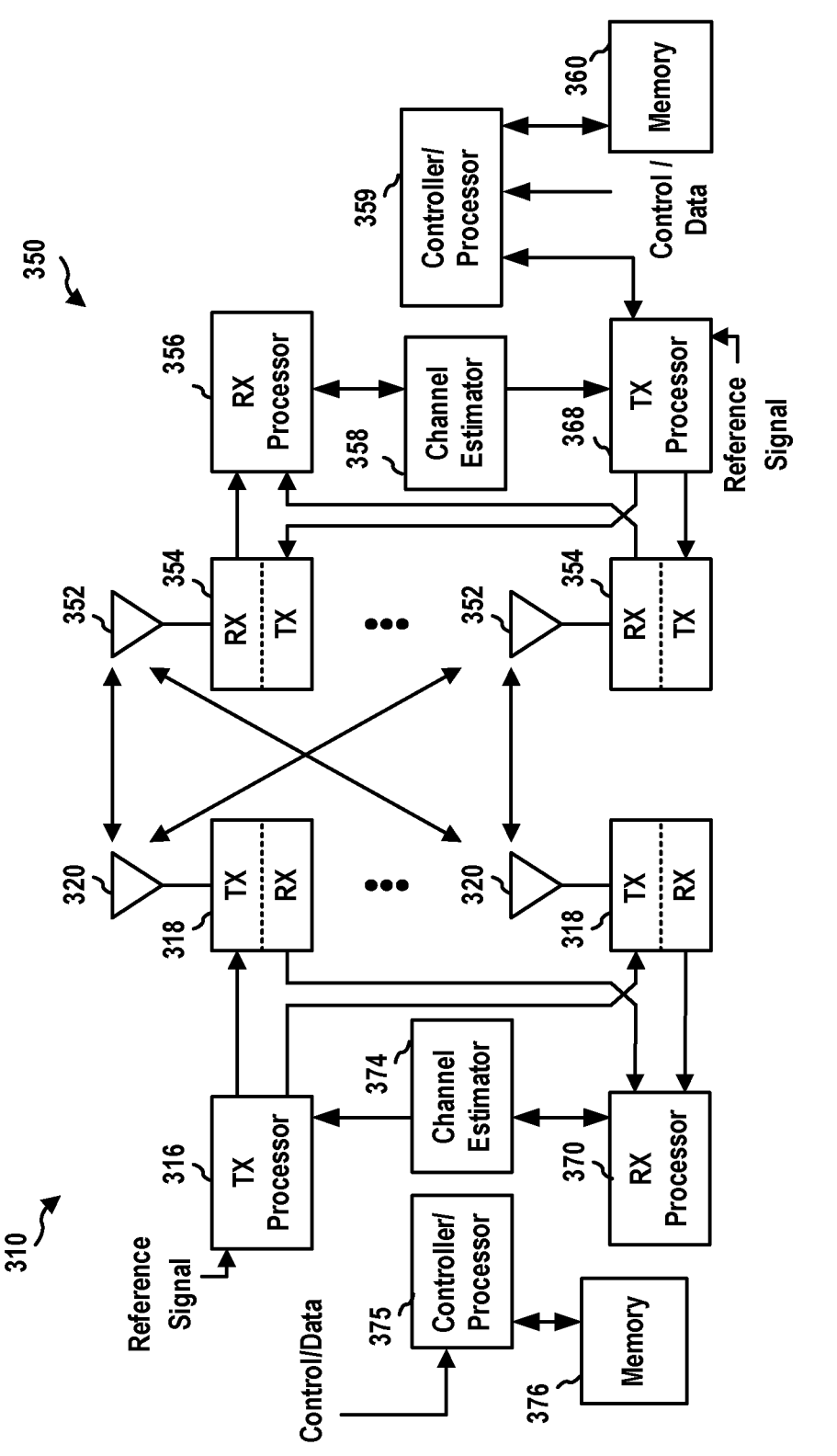
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the mini-slot SCI-1 component 198 of FIG. 1. In some aspects, the UE 104, 350 may include means for selecting, means for transmitting, means for sensing, means for receiving, and/or means for performing channel sensing. Such means may include one or more components of the UE 104, 350 described in connection with FIGS. 1 and 3.

Figure 4:
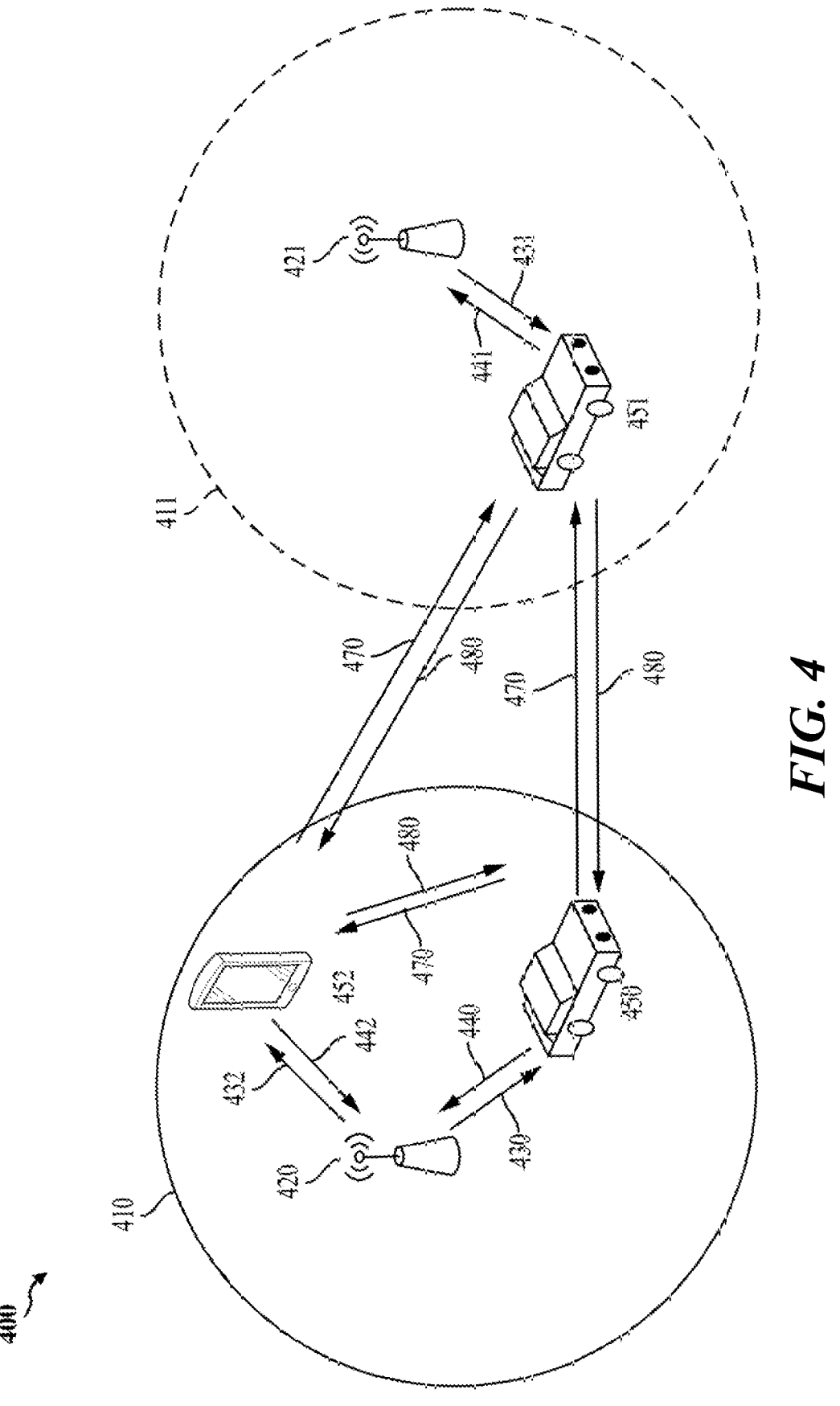
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more frequency division multiplexing (FDM) channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
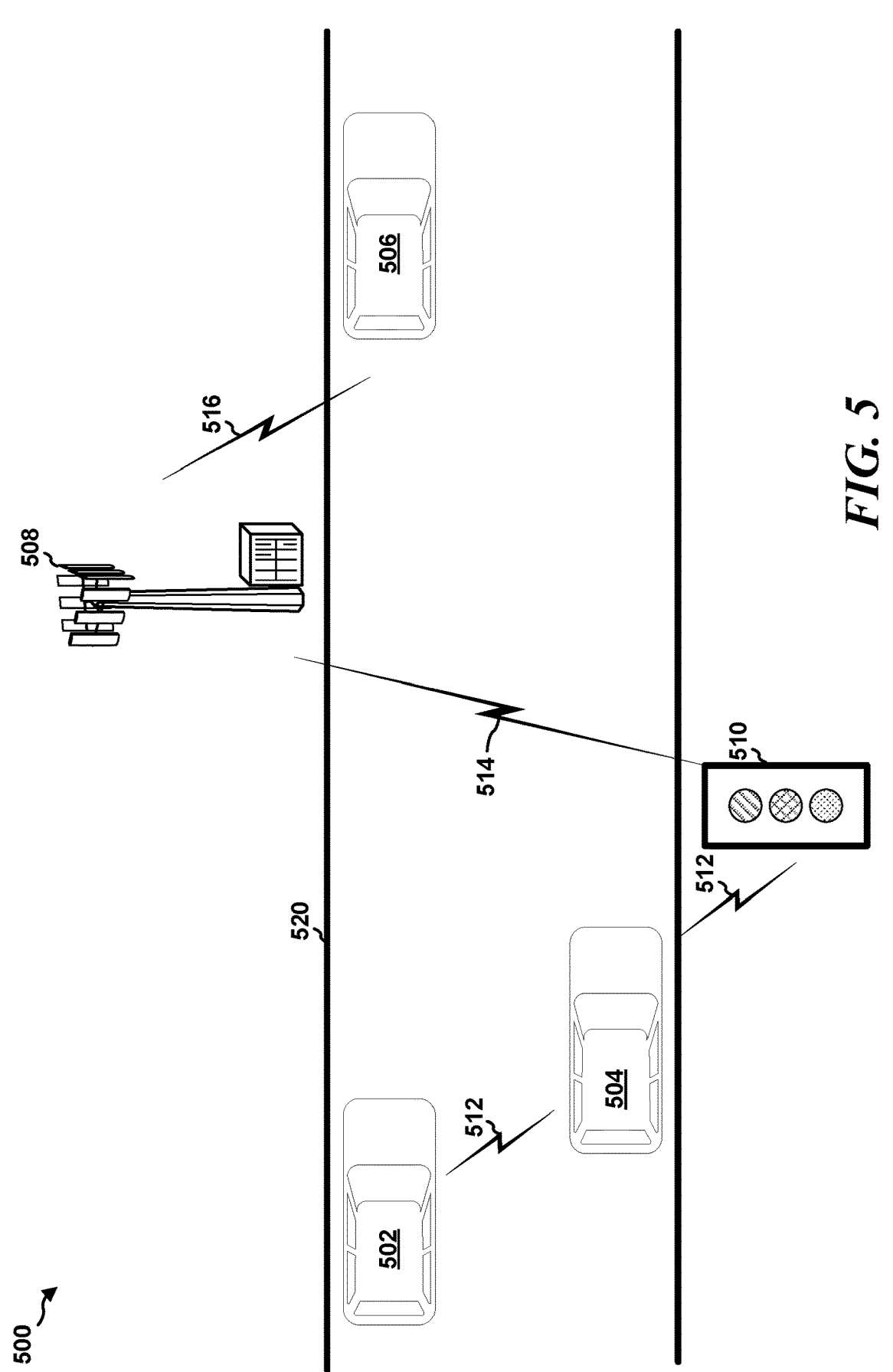
FIG. 5 is a block diagram illustrating an example of a vehicle-to-everything (V2X) system with a road side unit (RSU), in accordance with various aspects of the present disclosure.

FIG. 5 illustrates an example of a vehicle-to-everything (V2X) system with a road side unit (RSU), according to aspects of the present disclosure. As shown in FIG. 5, V2X system 500 includes a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Figure 6:
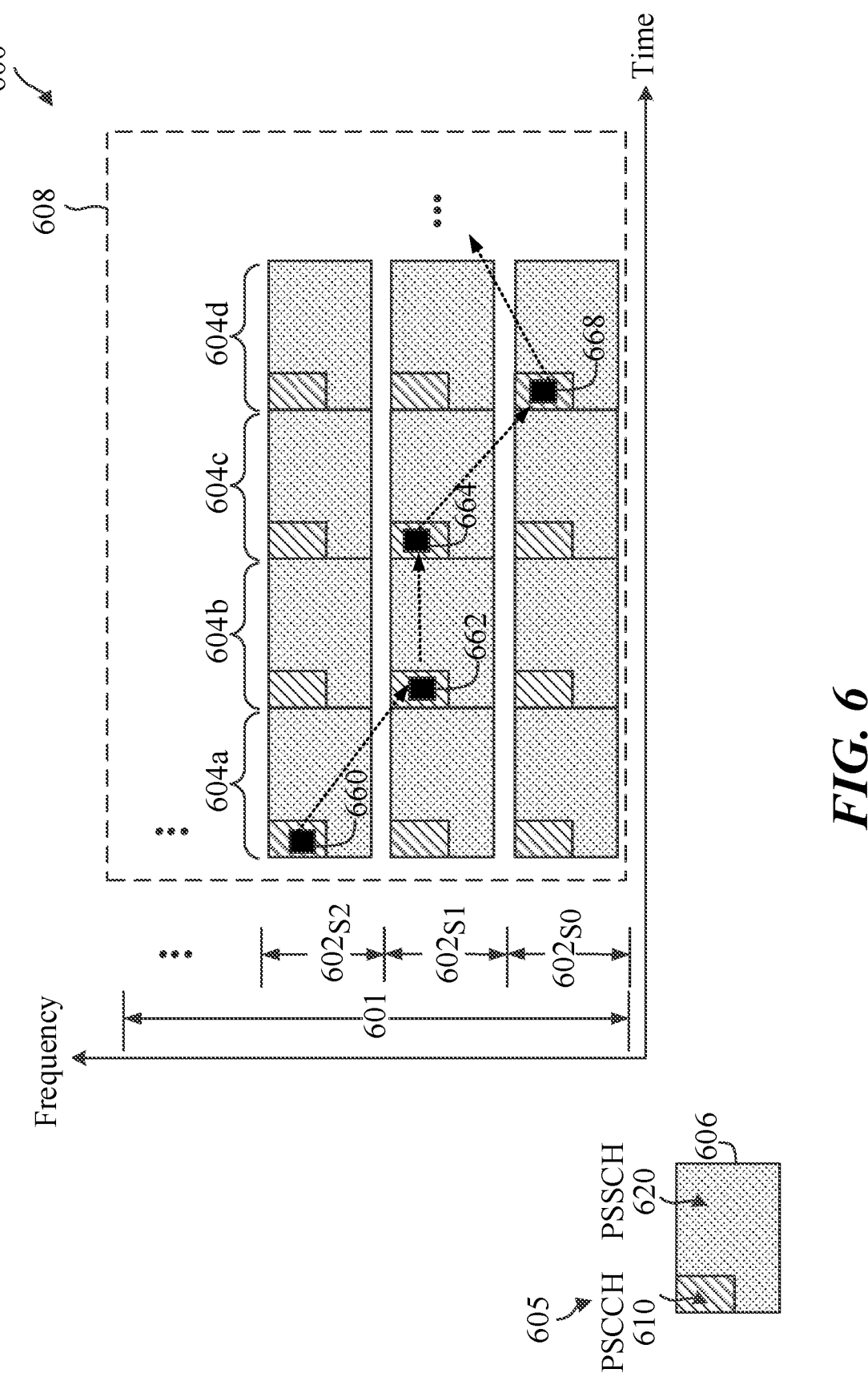
FIG. 6 is a graph illustrating a sidelink (SL) communications scheme, in accordance with various aspects of the present disclosure.

FIG. 6 is a graph illustrating a sidelink (SL) communications scheme, in accordance with various aspects of the present disclosure. A scheme 600 may be employed by UEs such as the UEs 104 in a network such as the network 100. In FIG. 6, the x-axis represents time and the y-axis represents frequency. The C2VX channels may be for 3GPP Release 16 and beyond.

In the scheme 600, a shared radio frequency band 601 is partitioned into multiple subchannels or frequency subbands 602 (shown as $602_{S0}$, $602_{S1}$, $602_{S2}$) in frequency and multiple sidelink frames 604 (shown as 604a, 604b, 604c, 604d) in time for sidelink communications. The frequency band 601 may be at any suitable frequencies. The frequency band 601 may have any suitable bandwidth (BW) and may be partitioned into any suitable number of frequency subbands 602. The number of frequency subbands 602 can be dependent on the sidelink communications BW requirement.

Each sidelink frame 604 includes a sidelink resource 606 in each frequency subband 602. A legend 605 indicates the types of sidelink channels within a sidelink resource 606. In some instances, a frequency gap or guard band may be specified between adjacent frequency subbands 602, for example, to mitigate adjacent band interference. The sidelink resource 606 may have a substantially similar structure as an NR sidelink resource. For instance, the sidelink resource 606 may include a number of subcarriers or RBs in frequency and a number of symbols in time. In some instances, the sidelink resource 606 may have a duration between about one millisecond (ms) to about 20 ms. Each sidelink resource 606 may include a PSCCH 610 and a PSSCH 620. The PSCCH 610 and the PSSCH 620 can be multiplexed in time and/or frequency. The PSCCH 610 may be for part one of a control channel (CCH), with the second part arriving as a part of the shared channel allocation. In the example of FIG. 6, for each sidelink resource 606, the PSCCH 610 is located during the beginning symbol(s) of the sidelink resource 606 and occupies a portion of a corresponding frequency subband 602, and the PSSCH 620 occupies the remaining time-frequency resources in the sidelink resource 606. In some instances, a sidelink resource 606 may also include a physical sidelink feedback channel (PSFCH), for example, located during the ending symbol(s)

of the sidelink resource 606. In general, a PSCCH 610, a PSSCH 620, and/or a PSFCH may be multiplexed within a sidelink resource 606.

The PSCCH 610 may carry SCI 660 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 606.

In a sidelink frame structure, such as an NR sidelink frame structure, the sidelink frames 604 in a resource pool 608 may be contiguous in time. A sidelink UE (e.g., the UEs 104) may include, in the SCI 660, a reservation for a sidelink resource 606 in a later sidelink frame 604. Thus, another sidelink UE may perform SCI sensing in the resource pool 608 to determine whether a sidelink resource 606 is available or occupied. For instance, if the sidelink UE detected the SCI 660, indicating a reservation for a sidelink resource 606, the sidelink UE may refrain from transmitting in the reserved sidelink resource 606. If the sidelink UE determines that there is no reservation detected for a sidelink resource 606, the sidelink UE may transmit in the sidelink resource 606. As such, SCI sensing can assist a UE in identifying a target frequency subband 602 to reserve for sidelink communications and to avoid intra-system collision with another sidelink UE in the NR sidelink system. In some aspects, the UE may be configured with a sensing window for SCI sensing or monitoring to reduce intra-system collision.

The SCI 660 may be conveyed in one or more stages. The first stage SCI (SCI-1) may be carried on the PSCCH 610, while the second stage SCI (SCI-2) may be carried on the corresponding PSSCH 620. The SCI-1 may include one or more fields to indicate a location of the reserved resources. For example, the SCI-1 may include, without limitation, one or more fields to convey a frequency domain resource allocation (FDRA), a time domain resource allocation (TDRA), a resource reservation period (e.g., a period for repeating the SCI transmission and the corresponding reserved resources), a modulation and coding scheme (MCS) for an SCI-2, a beta offset value for the SCI-2, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the SCI-2. The beta offset may also indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18.

In some examples, the FDRA may be a number of bits in the SCI-1 that may indicate a number of slots and a number of subchannels reserved for the reserved resources (e.g., a receiving UE may determine a location of the reserved resources based on the FDRA by using the subchannel including the PSCCH 610 and SCI-1 as a reference). The TDRA may be a number of bits in the SCI-1 (e.g., 5 bits, 9 bits, or some other number of bits) that may indicate a number of time resources reserved for the reserved resources. In this regard, the SCI-1 may indicate the reserved resources to the one or more sidelink UEs in the wireless communication network.

The sidelink UEs may attempt to decode the reserved resources indicated by the SCI-1. In some aspects, the reserved resources may be used for retransmission of sidelink data or the SCI-1. Additionally or alternatively, the reserved resources may include resources for sidelink transmissions, such as a PSSCH 620.

A slot may be partitioned into multiple sub-slots or mini-slots. The mini-slots may be transmitted via the PSSCH 620 using one or more symbols. In some examples, the PSSCH 620 may be transmitted via one or more time or frequency resources via one or more full or partial symbols. An SCI-2 may be transmitted via one or more symbols of the PSSCH 620. The SCI-2 may be transmitted in a symbol(s) near or at the beginning of a slot. The SCI-2 may indicate one or more reserved resources that may be used by the transmitting UE for sidelink transmissions. The SCI-2 may thereby be received and decoded by sidelink UEs intended to receive and decode a corresponding sidelink communications.

In some aspects, the transmitting UE may transmit SCI-1 to one or more receiving UEs indicating whether multiple mini-slots are enabled or disabled for a slot. In this regard, the transmitting UE may transmit the SCI-1 over the PSCCH 610. The UE may transmit the SCI-1 indicating a mini-slot configuration in the time and/or frequency domain for the mini-slots. The UE may transmit a PSCCH 610 communication that includes SCI-1 applicable to all of the mini-slots in the slot. Additionally or alternatively, the UE may transmit a PSCCH 610 communication that includes SCI-1 applicable to one or more mini-slots and/or a subset of the mini-slots in the slot.

In some aspects, the sidelink UE may be configured with a frequency hopping pattern. In this regard, the sidelink UE may hop from one frequency subband 602 in one sidelink frame 604 to another frequency subband 602 in another sidelink frame 604. In the illustrated example of FIG. 6, during the sidelink frame 604a, the sidelink UE transmits SCI 660 in the sidelink resource 606 located in the frequency subband $602_{S2}$ to reserve a sidelink resource 606 in a next sidelink frame 604b located at the frequency subband $602_{S1}$. Similarly, during the sidelink frame 604b, the sidelink UE transmits SCI 662 in the sidelink resource 606 located in the frequency subband $602_{S1}$ to reserve a sidelink resource 606 in a next sidelink frame 604c located at the frequency subband 602S1. During the sidelink frame 604c, the sidelink UE transmits SCI 664 in the sidelink resource 606 located in the frequency subband $602_{S1}$ to reserve a sidelink resource 606 in a next sidelink frame 604d located at the frequency subband $602_{S0}$. During the sidelink frame 604d, the sidelink UE transmits SCI 668 in the sidelink resource 606 located in the frequency subband $602_{S0}$. The SCI 668 may reserve a sidelink resource 606 in a later sidelink frame 604.

The SCI can also indicate scheduling information and/or a destination identifier (ID) identifying a target receiving sidelink UE for the next sidelink resource 606. Thus, a sidelink UE may monitor SCI transmitted by other sidelink UEs. Upon detecting SCI in a sidelink resource 606, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 604 in different frequency subband (e.g., via frequency division multiplexing (FDM)). For instance, in the sidelink frame 604b, one pair of sidelink UEs may communicate sidelink data using a sidelink resource 606 in the frequency subband $602_{S2}$ while another pair of sidelink UEs may communicate sidelink data using a sidelink resource 606 in the frequency subband $602_{S1}$.

In some aspects, the scheme 600 is used for synchronous sidelink communications. That is, the sidelink UEs may be synchronized in time and are aligned in terms of symbol boundary, sidelink resource boundary (e.g., the starting time of sidelink frames 604). The sidelink UEs may perform synchronization in a variety of forms, for example, based on sidelink synchronization signal blocks (SSBs) received from a sidelink UE and/or NR-U SSBs received from a base station (e.g., the base stations 105 and/or 205) while in-coverage of the base station. In some aspects, the sidelink UE may be preconfigured with the resource pool 608 in the frequency band 601, for example, while in coverage of a serving base station. The resource pool 608 may include multiple sidelink resources 606. The base station can configure the sidelink UE with a resource pool configuration indicating resources in the frequency band 601 and/or the subbands 602 and/or timing information associated with the sidelink frames 604. In some aspects, the scheme 600 includes mode-2 radio resource allocation (RRA) (e.g., supporting autonomous radio resource allocation that can be used for out-of-coverage sidelink UEs or partial-coverage sidelink UEs).

Figure 7A:
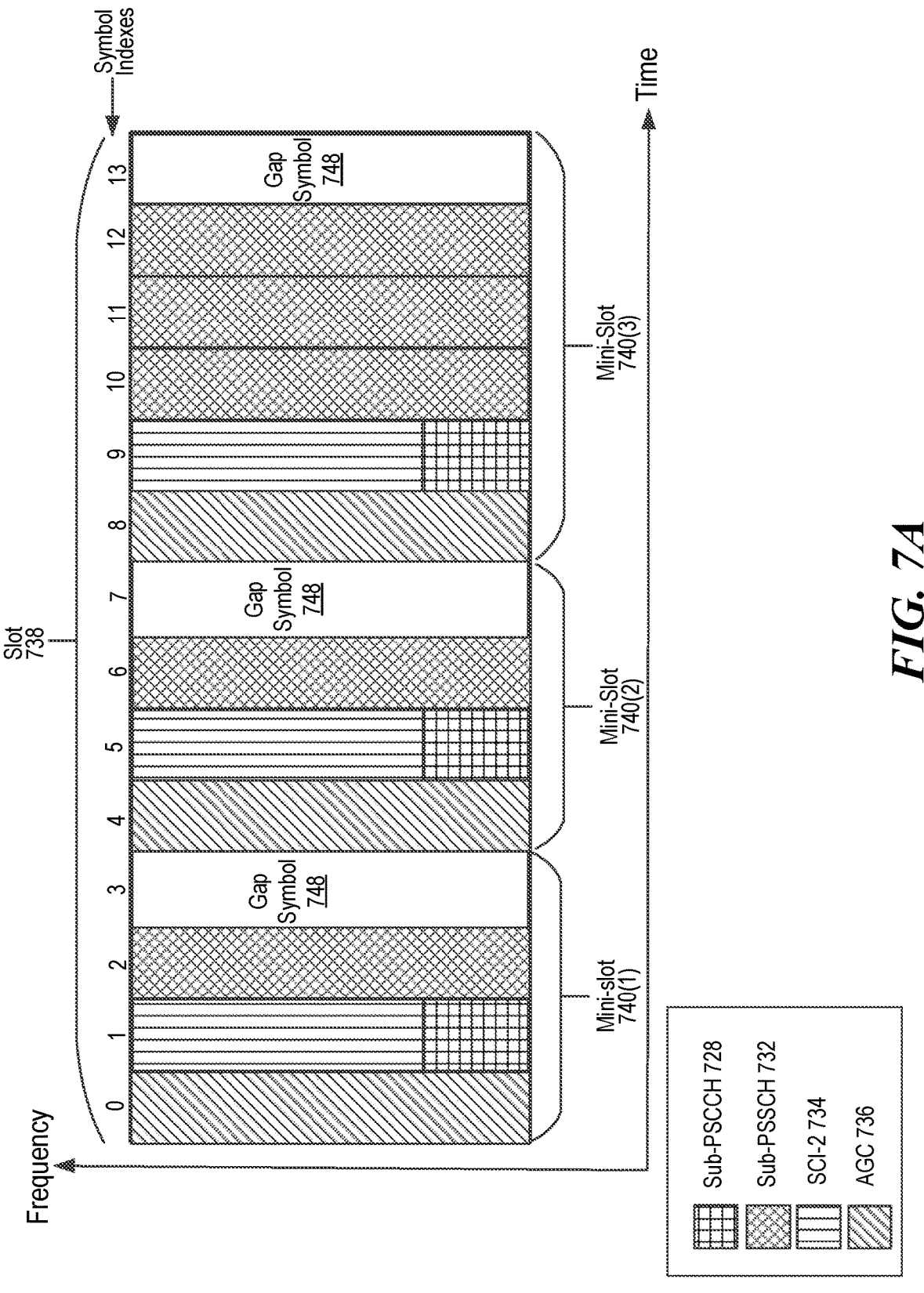
FIG. 7A is a block diagram illustrating an example of a slot partitioned into mini-slots, in accordance with various aspects of the present disclosure.

FIG. 7A illustrates a slot 738 partitioned into mini-slots 740 according to some aspects of the present disclosure. In FIG. 7A, the x-axis represents time in some arbitrary units and the Y-axis represents frequency in some arbitrary units. In some aspects, the UE 104 may map a sub-PSSCH 732, an SCI 734, and an automatic gain control (AGC) symbol 736 to any or all of the mini-slots 740 in a slot 738. The UE 104 may map multiple sub-PSSCHs 732, SCIs 734, and AGC symbols 736 to multiple mini-slots 740 within the slot 738. In some instances, each of the sub-PSSCHs 732, SCIs 734, and AGC symbols 736 mapped in a mini-slot 740 may be used by a different UE 104 to transmit a transport block (TB) to a different UE 104 over a sidelink channel. In this manner, the UEs 104 may increase the utilization of time/frequency resources within the slot 738 as compared to a single UE transmitting a TB to a single UE in the slot 738.

By partitioning the slot 738 into the mini-slots 740, each mini-slot 740(1) . . . 740(3) may be utilized by a different UE 104 to transmit a TB, facilitating the transmission of multiple TBs by multiple UEs 104 in a single slot 738. In some instances, the UE 104 that partitions the slot into the mini-slots and/or transmits the mini-slot structure to other UEs 104 may be referred to as a leading UE. In some instances, the UEs 104 that receive the mini-slot structure from the leading UE 104 may be referred to as following UEs 104. In some instances, the leading UE 104 may assign each of the following UEs 104 a particular mini-slot of the mini-slots in which the following UE 104 may transmit a TB. In some instances, the following UEs 104 will be assigned and transmit during mini-slots following the leading mini-slot of the mini-slots. In some instances, the leading UE 104 indicates the mini-slot assignments of the following UEs 104 in sidelink control information (SCI). In some instances, the UE 104 may be a leading UE 104 that receives a mini-slot partitioning configuration from a base station (e.g., base station 102). The UE 104 may receive a resource pool (RP) configuration from the base station 102 that defines the resource pool for the mini-slots 740. In this regard, the UE 104 may receive the mini-slot 740 and/or resource pool configurations in a radio resource control (RRC) message and/or a downlink control information (DCI) message (e.g., a DCI-3 signal, DCI-1 signal). The leading UE 104 may partition the slot 738 into multiple mini-slots 740 based on the mini-slot configuration and/or the resource pool configuration. The leading UE 104 may transmit the mini-slot structure to the following UEs 104. In some instances, the leading UE 104 communicates the mini-slot structure to the following UEs 104 in SCI. In some aspects, the leading UE 104 may transmit a TB in a leading mini-slot 740(1) (e.g., the earliest mini-slot in time) defined for the slot 738. The UE 104 may transmit the SCI with the mini-slot structure to the following UEs 104 in the leading mini-slot 740(1). The leading UE 104 may assign each of the following UEs 104 a particular mini-slot 740 of the mini-slots 740(1) . . . 740(3) in which the following UE 104 may transmit a TB. In some instances, the leading UE 104 indicates the assignment of the following UEs 104 to the mini-slots 740 in the mini-slot structure communicated to the following UEs 104 in the SCI.

In some aspects, the UE 104 partitions the slot 738 such that each mini-slot 740 occupies multiple symbols within the slot 738. For example, a slot 738 may include 2, 3, 4, or more mini-slots. In some instances, a slot may include 14 symbols. A mini-slot 740 may occupy 2, 3, 4, 5, 6, or more symbols. In some aspects, each mini-slot 740 may occupy contiguous symbols within the slot 738. In this regard, each mini-slot 740 may occupy groups of symbols that are contiguous in time. The group of contiguous symbols may include any number of symbols contained within the slot 738. The mini-slot 740(1) may occupy symbol indexes 0-3. The mini-slot 740(2) may occupy symbol indexes 4-7. The mini-slot 740(3) may occupy symbol indexes 8-13, or any other group of contiguous symbols within the slot 738. The number of symbols occupying the mini-slot 738 may be based on the size of the TB to be transmitted. A larger TB may specify more symbols than a smaller TB.

In some aspects, the UE 104 may map an AGC symbol 736 to each mini-slot 740 of the slot 738. A receiving UE 104 may receive a TB from a transmitting UE 104 in a sub-PSSCH 732. The signal strength of the sub-PSSCH 732 may vary over a wide dynamic range depending on channel attenuation and interference. The AGC symbol 736 may be used to adjust the strength of the received signal in order to reduce the quantization error at the analog to digital converter (ADC) of the receiving UE 104. In some instances, the AGC symbol 736 may help a UE's receiver to adjust the gain of a front-end amplifier. In some aspects, the UE 104 may map the AGC symbol 736 to the leading symbol (e.g., the earliest symbol) in the mini-slot 740. The UE 104 may map the AGC symbol 736 to the leading symbol in order for a receiving UE 104 to properly set the gain of the amplifier and successfully decode the subsequent symbols of the mini-slot 740. For example, the UE 104 may map the AGC symbol 736 to the leading symbols 0, 4, and 8 in mini-slots 740(1), 740(2), and 740(3), respectively.

In some aspects, the UE 104 may map a sub-PSSCH 732 to each mini-slot 740 of the slot 738. Each sub-PSSCH 732 of each mini-slot 740 may occupy one or more symbols. The sub-PSSCHs 732 may carry one or more transport blocks (TBs) that include the data to be communicated by a transmitting UE 104. The number of symbols the sub-PSSCH 732 occupies may be based on the size of the TB. As described above, in accordance with the present disclosure, each mini-slot 740 may be utilized by a different UE 104 to transmit the TB(s).

In some aspects, the UE 104 may map a gap symbol 748 (e.g., a guard period) to each mini-slot 740 of the slot 738. The gap symbol 748 of each mini-slot 740 may occupy a full symbol. In some instances, the UE 104 may map the gap symbol 748 to an ending symbol of the mini-slot 740. For example, the UE 104 may map the gap symbol 748 to the ending symbols 3, 7, and 13 in mini-slots 740(1), 740(2), and 740(3), respectively. The gap symbol 748 may be used for timing adjustments and/or for allowing UEs 104 to switch between transmission and reception.

In some aspects, the UE 104 may map an SCI to each mini-slot 740 of the slot 738. The SCI may include a first-stage SCI (SCI-1) and/or a second-stage SCI (SCI-2). Splitting the SCI into two stages (first-stage SCI and second-stage SCI) may allow UEs 104 to decode the first-stage SCI for channel sensing purposes, such as determining the resources reserved by other transmissions. The second-stage SCI may provide additional control information that allows the UE 104 to receive and decode a transmission. In this regard, the UE 104 may transmit the SCI-1 (first-stage SCI) to another UE 104 in a physical sidelink control channel (PSCCH). Referring to FIG. 7A, the leading UE 104 may transmit the mini-slot structure to the following UEs 104 in sub-PSCCHs 728. The SCI-1 carried by the sub-PSCCH 728 may include a beta offset associated with an SCI-2 (second-stage SCI) carried by the sub-PSSCH 732. The SCI-1 may include a modulation and encoding scheme (MCS) of the sub-PSSCH 732. The SCI-1 may include resource assignments for at least one mini-slot 740 of the mini-slots 740(1) . . . 740(3) of a slot 738 and/or resource assignments for at least one mini-slot 740 of another slot (e.g., a future slot). The resource assignments for the current slot 738 or for a future slot may be used by transmitting UE(s) 104 for retransmissions of TB(s) that are not successfully decoded by receiving UE(s) 104. The UEs 104 may be operating in a sidelink mode 1 in which the leading UE 104 receives the resource assignments from a serving base station (e.g., the base station 102). The leading UE 104 may transmit the resource assignments to the following UEs 104 in the SCI-1 carried by the sub-PSCCHs 728.

In some aspects, the UE 104 may transmit the SCI-2 734 to another UE 104 in a sub-PSSCH 732. The SCI-2 734 may include information used for decoding the sub-PSSCH 732 and for supporting HARQ feedback. The SCI-2 may include a UE source ID and a UE destination ID associated with a TB. The SCI-2 may also include a one-bit new data indicator (NDI) to specify whether the TB sent in the sub-PSSCH 732 corresponds to the transmission of new data or a retransmission.

In some aspects, the UE 104 may transmit a sub-PSSCH 732 in a mini-slot 740 that includes at least one demodulation reference signal (DMRS). A DMRS may be a reference signal used by the receiving UE(s) 104 for channel estimation and/or compensating for Doppler effects at high UE speeds. The DMRS may be included in each mini-slot 740 of the mini-slots 740(1) . . . 740(3) of a slot 738. In this regard, the DMRS may be located anywhere within the mini-slot 740. For example, the DMRS may be located in the first symbol of the mini-slot, the last symbol of the mini-slot, or an intermediate symbol of the mini-slot 740. In some aspects, the DMRS may include all resource elements (REs) within the symbol. In some aspects, the DMRS may include a portion of the REs within the symbol. For example, the DMRS may include a portion of the REs within the same symbol that occupies the SCI-2 734.

In some aspects, the UE 104 may partition a slot 738 into multiple mini-slots 740. Each of the mini-slots 740 may be used by a different UE 104 to transmit a TB via a sub-PSSCH 732. Each of the mini-slots 740 may include a structure similar to a slot 738 structure. For example, each mini-slot 740 may include an AGC symbol 736, a sub-PSCCH 728 (e.g., carrying an SCI-1), a sub-PSSCH 732 (e.g., carrying data, an SCI-2, and/or DMRS), and/or a gap symbol 748. Some UEs 104 may support both the slot 738 structure and the mini-slot 740 structure. Some UEs 104 may support only the mini-slot 740 structure. FIG. 7A is a block diagram illustrating an example of the mini-slot structure of a greenfield network that only includes UEs 104 that support the mini-slot structure. In contrast to the example of FIG. 7B below, the mini-slot structure of FIG. 7A includes a mini-slot SCI-1 and omits a slot SCI-1. Some UEs 104 may support only the slot 738 structure. The SCI-1 may include a mini-slot SCI-1 and/or a slot SCI-1. In some aspects, the mini-slot SCI-1 may be understood only by those UEs 104 that support the mini-slot 740 structure. In some instances, the UE 104 may also map a sub-PSCCH 732 to the mini-slot 740 of the mini-slots 740(1) . . . 740(3) of the slot 738. In some instances, the mini-slot 740(1) is a leading mini-slot (e.g., the earliest mini-slot in time) of the mini-slots 740(1) . . . 740(3). The UE 104 may transmit a mini-slot SCI-1 via the sub-PSCCH 728 to the other UEs 104 while refraining from transmitting a slot SCI-1 when the other UEs 104 support the mini-slot structure. For example, the network may be a greenfield network that only includes UEs 104 that support the mini-slot structure. By supporting the mini-slot structure, the other UEs 104 may be able to decode and understand the contents of the mini-slot SCI-1 such that a slot SCI-1 can be omitted.

Figure 7B:
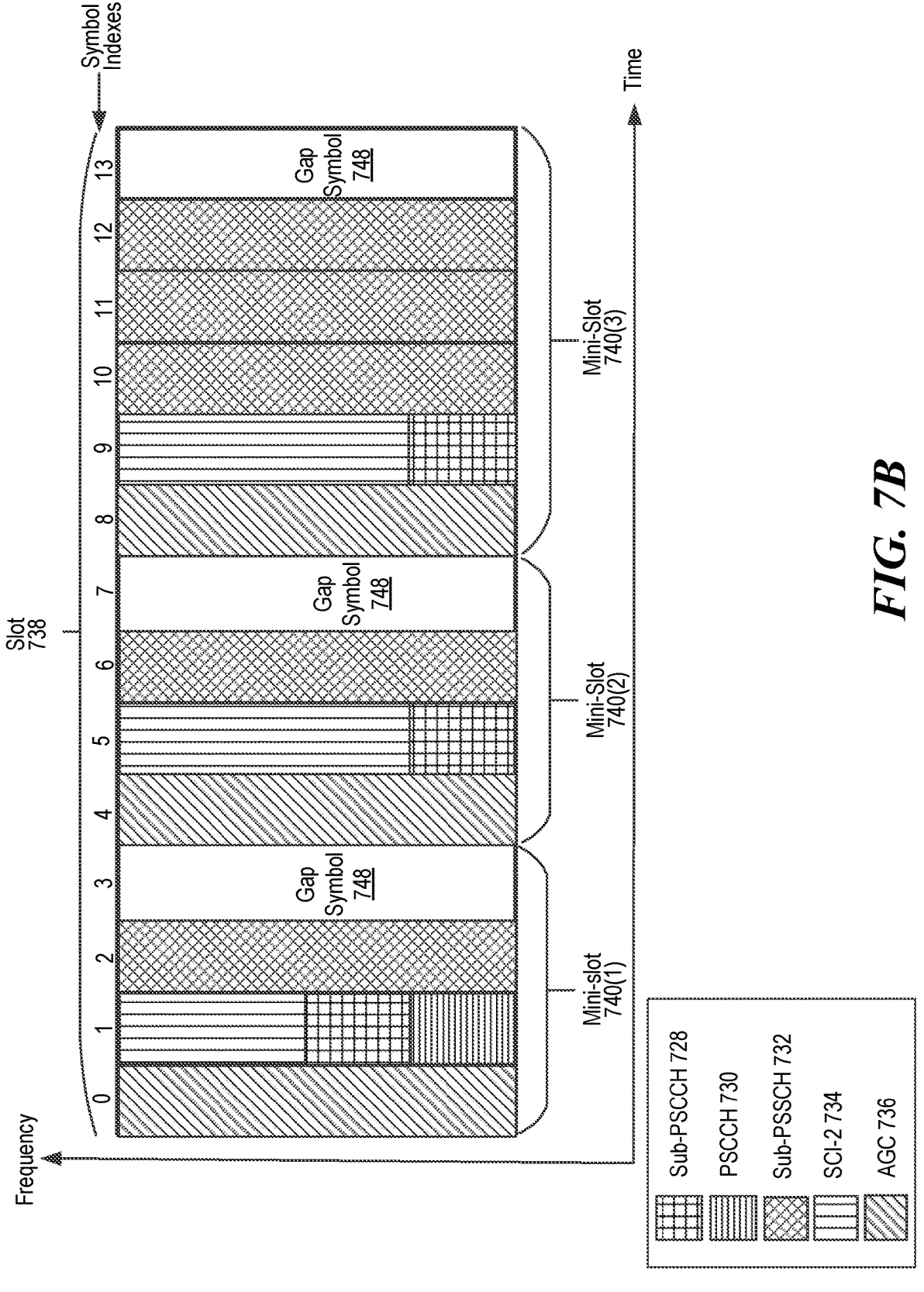
FIG. 7B is a block diagram illustrating an example of an alternate configuration of a slot partitioned into mini-slots, in accordance with various aspects of the present disclosure.

FIG. 7B is a block diagram illustrating an example of a slot 738 partitioned into mini-slots 740 according to some aspects of the present disclosure. In FIG. 7B, the x-axis represents time in some arbitrary units and the Y-axis represents frequency in some arbitrary units. The UE (e.g., the UE 104) may map sub-PSSCHs 732, SCIs 734, and AGC symbols 736 to any or all of the mini-slots 740 in a slot 738. In some aspects, the UE 104 may map multiple sub-PSSCHs 732, SCIs 734, and AGC symbols 736 to multiple mini-slots 740 within the slot 738. In some instances, each of the sub-PSSCHs 732, SCIs 734, and AGC symbols 736 mapped in a mini-slot 740 may be used by a different UE 104 to transmit a TB to a different UE 104 over a sidelink channel. In this manner, the transmitting UEs 104 may increase the utilization of time/frequency resources within the slot 738 as compared to a single UE 104 transmitting a TB to another single UE 104 in the slot 738. By partitioning the symbols into multiple mini-slots 740 within the slot 738, each mini-slot 740 may include a different TB destined to a different receiving UE 104.

In some aspects, the network may include a mix of both UEs 104 that support the mini-slot structure and UEs 104 that do not support the mini-slot structure. In contrast to the example of FIG. 7A, in which the network includes UEs 104 that only support the mini-slot structure, in the example of FIG. 7B, the network may include a mix of UEs 104 that support the slot structure and UEs 104 that support the mini-slot structure. In this case, the UE 104 described with reference to FIG. 7B may include both a slot SCI-1 and a mini-slot SCI-1 in the sub-PSCCH 728 in the leading mini-slot, in contrast to the slot structure of FIG. 7A that includes a mini-slot SCI-1 and omits a slot SCI-1. In the example of FIG. 7B, the slot SCI-1 may be carried in a PSCCH 730 in a location such that UEs 104 that do not support the mini-slot structure may receive and understand the slot SCI-1. For example, the slot SCI-1 may be located in a legacy location, such as the first symbol (e.g., symbol index 1) following the AGC symbol 736 in the slot 738. The slot SCI-1 information may include the time and/or frequency resources for the current slot 738 and future reserved slots. The mini-slot SCI-1 may be carried in the sub-PSCCH 728 in the same symbol (e.g., symbol index 1) as the slot SCI-1 but may occupy different frequency resources. For example, the mini-slot SCI-1 may occupy resource elements adjacent to the slot SCI-1. In some aspects, when the slot structure occupies more than one frequency subchannel, the mini-slot SCI-1 may occupy resource elements in the same location as the slot SCI-1 but in a different subchannel. For example, the mini-slot SCI-1 may occupy resource elements in a subchannel adjacent to the subchannel carrying the slot SCI-1. In some aspects, the UE 104 may include a slot SCI-1 in the PSCCH 730 in the leading mini-slot 740(1) and include a mini-slot SCI-1 in the sub-PSCCHs 728 in the remaining mini-slots 740(2) and 740(3) of the slot 738.

In some aspects, an AGC power reservation signal is introduced for coexistence of slot based and mini-slot based resource pools. In these aspects, a slot based receiver may estimate the total receive power including the later arriving mini-slot at symbol zero, and still have a conservative AGC setting.

With the first stage sidelink control information (SCI-1), the transmitter can reserve resources for up to three retransmissions in a periodic pattern. The period can be indicated in the SCI-1, where the value can range from 1-99 slots, or 100, 200, or 1000 slots. A value of 0 means no periodic reservation. The SCI-1 may be configured by radio resource control (RRC) to reserve up to one or two additional slots within 32 slots of the first transmission. A node can be triggered to report available resources to an upper layer. The information may be determined from historic SCI-1 monitoring by taking into consideration the resources reserved, or the priority of the monitored SCI-1. For a monitored SCI-1, the UE will reserve the resource for up to three transmissions, one being the current transmission, and two remaining transmissions, as well as up to three resources for the next instance of the indicated period if a non-zero period is indicated. When the UE cannot monitor due to half duplex restrictions, the UE assumes the worst case scenario, where there is an SCI-1 transmitted in the slot but not detected. Consequently, the UE block the slots possibly indicated by all periods configured, which may be up to fifteen slots.

Mini-slots in dedicated subchannels may carry sidelink feedback information (SLFI) without data or a physical sidelink shared channel (PSSCH). The mini-slot SCI-1 or SCI-2 carries the SLFI. SLFI resources may be configured in a mini-slot or slot-based resource pool (RP). SLFI resource mapping may be defined in subchannels or mini-slots. The mini-slot SCI-2 may carry a slot offset value (K0) and SLFI resource indication for the hybrid automatic repeat request (HARQ) feedback and channel state information (CSI) report. As with base station controlled networks, the transmitter may assign orthogonal SLFI resources for its receiver.

Figure 8:
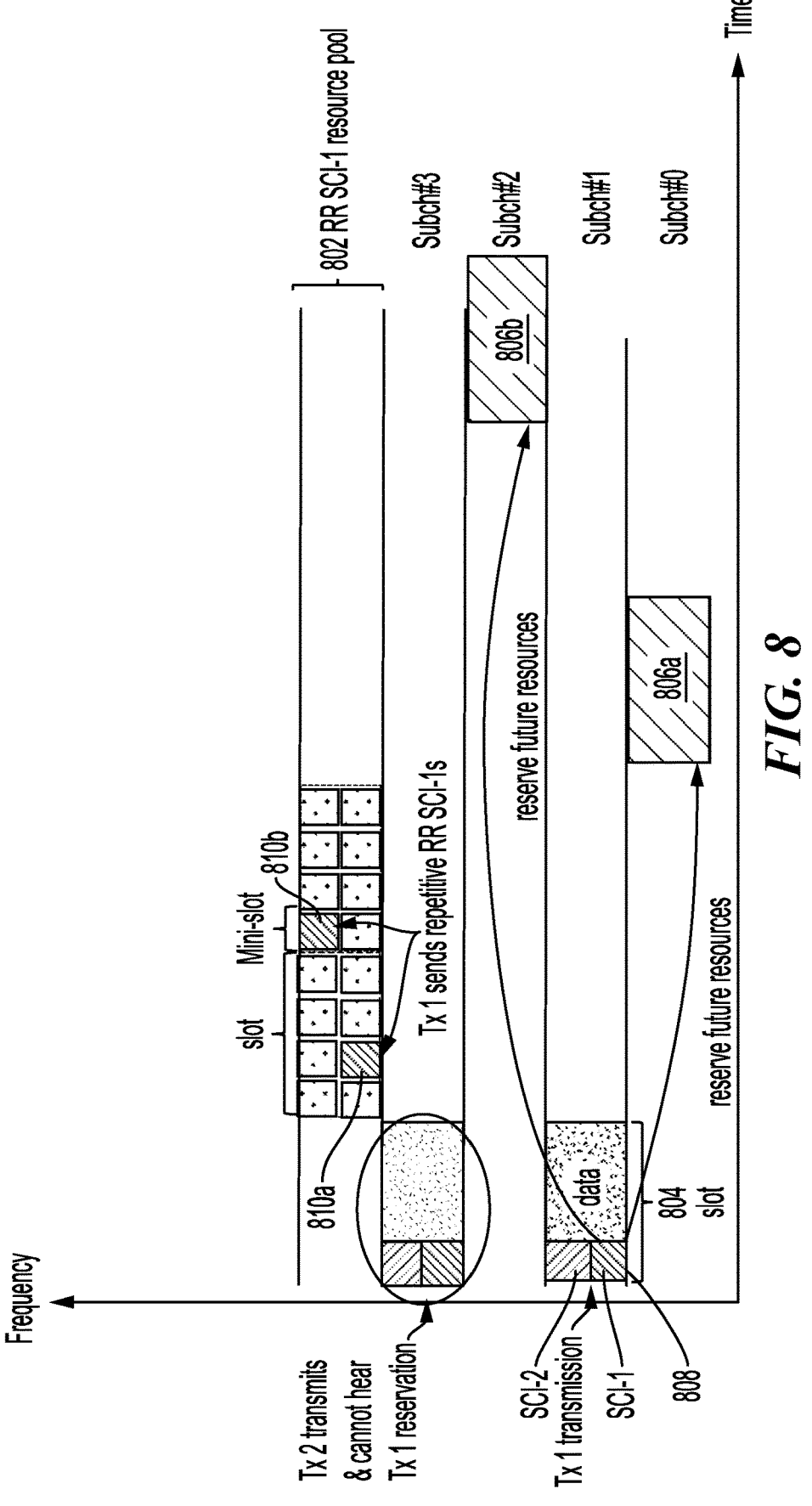
FIG. 8 is a timing diagram illustrating an example of a dedicated resource reservation first stage sidelink control information (SCI-1) resource pool.

A dedicated mini-slot resource pool may carry resource reservation SCI-1 repetition to prevent collisions from other UEs on future reserved resources for retransmission due to half duplex communication. FIG. 8 is a timing diagram illustrating an example of a dedicated resource reservation SCI-1 resource pool 802. In the example of FIG. 8, a second transmitter (Tx 2) is a half duplex device, meaning it can only transmit or receive at one time. Thus, when transmitting, the second transmitter TX 2 cannot receive. When the second transmitter Tx 2 transmits during a slot 804, it cannot hear a resource reservation of a first transmitter (Tx 1). The first transmitter Tx 1 transmits a reservation for future resources 806a, 806b in its SCI-1 transmission 808 during the slot 804.

The dedicated resource reservation (RR) SCI-1 resource pool 802 may contain multiple potential PSCCH resources in time and frequency domain with a mini-slot structure. A delay sensitive transmitter may transmit repetitive resource reservation (RR) SCI-1s using resources from the dedicated resource reservation SCI-1 resource pool in a configurable number of slots to increase the chance of the resource reservation being heard by other transmitters, and hence reduce the collision for future resource reservations. The other receivers may perform blind decoding for repetitive RR SCI-1s in the resource pool to protect the transmitter. To reduce blind decoding complexity, an SCI-1 search space may be defined in the resource reservation SCI-1 resource pool based on the transmitter ID, for example. As seen in FIG. 8, the first transmitter Tx 1 transmits two additional resource reservation SCI-1s 810a, 810b in the dedicated resource pool 802. The second transmitter Tx 2 receives these resource reservations, reducing the likelihood of conflicts with the future resources 806a, 806b.

In a sidelink network deployment with ultra-reliable low latency communications (URLLC) traffic, such as with industrial internet of things (IIoT) devices, channel sensing with a sidelink control information (SCI) resource reservation for retransmission is a bottleneck for sidelink mode-2 operation. The bottleneck may prevent the devices from achieving latency specifications. In the 3GPP Release 16 design, other transmitters may transmit on the target transmitter's reserved resources for critical retransmission as they may not hear the SCI-1 reservations from the target transmitter due to half duplex limitations. This may occur, even though the messages are frequency division multiplexed. If the target transmitter cannot succeed in the retransmission in a reserved resource, a packet delay budget (PDB) may not be satisfied due to collision. According to aspects of the present disclosure, a new SCI-1 design enables time division multiplexed scheduling of multiple SCI-1 messages in the same slot subchannels. The new design may assist the half duplex sidelink transmitter with obtaining the other transmitter's resource reservations if the scheduled sub channels do not collide. The new design may also prevent collisions on critical retransmissions from the target transmitter.

Figure 9:
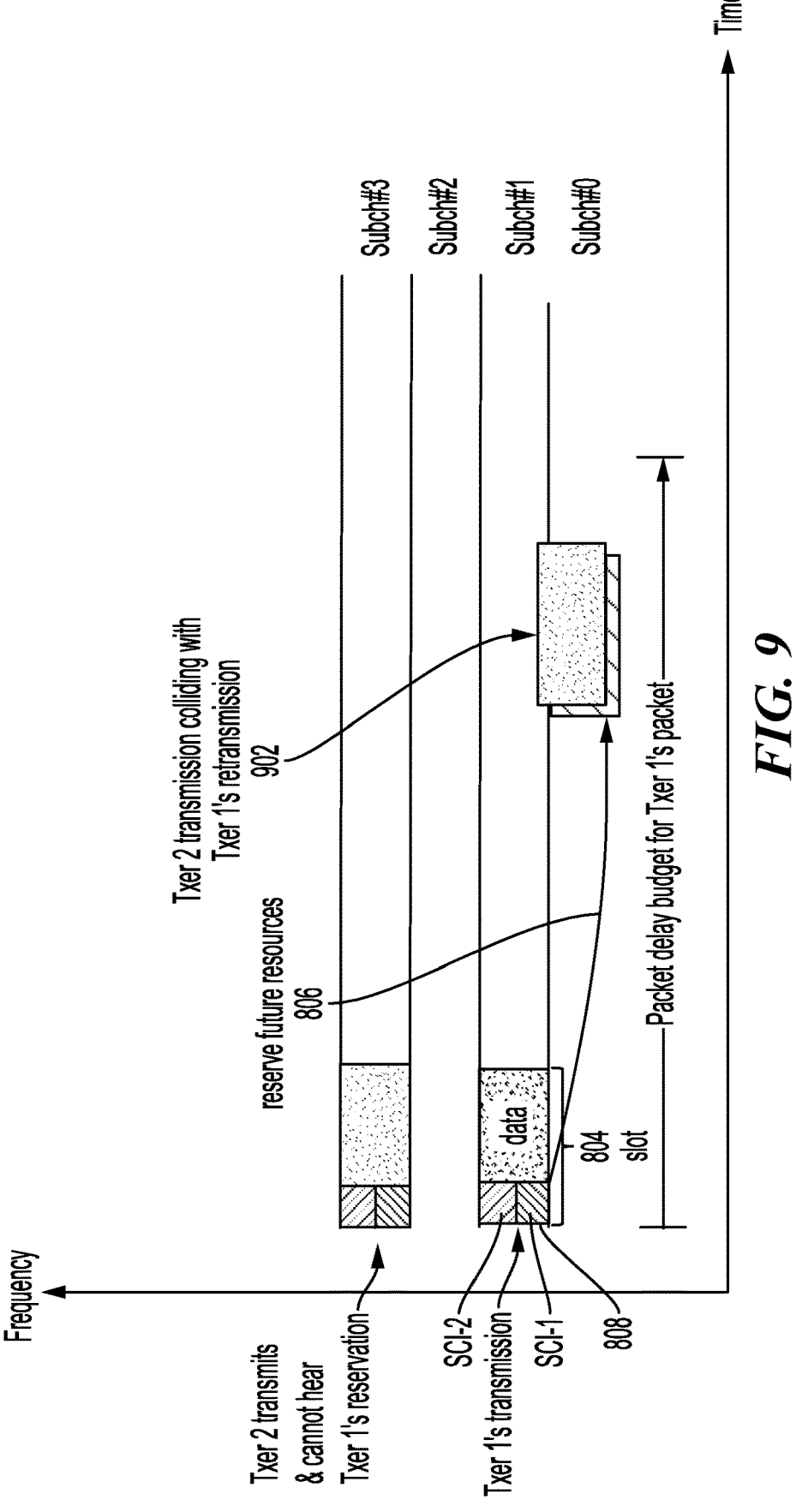
FIG. 9 is a timing diagram illustrating an example of a retransmission collision.

FIG. 9 is a timing diagram illustrating an example of a retransmission collision. In the example of FIG. 9, a second transmitter (Tx 2) is a half duplex device, meaning it can only transmit or receive at one time. Thus, the second transmitter TX 2 cannot receive a message while transmitting. In the example of FIG. 8, the second transmitter Tx 2 transmits during the slot 804. In this example, the second transmitter Tx 2 cannot hear a resource reservation of a first transmitter (Tx 1) during the slot 804. The first transmitter Tx 1 transmits a reservation for the future resource 806 in its SCI-1 transmission 808 during the slot 804. Due to the inability to receive the resource reservation of the first transmitter Tx 1, a transmission 902 from the second transmitter Tx 2 collides with the retransmission in the future resource 806 reserved by the first transmitter TX 1.

Figure 10:
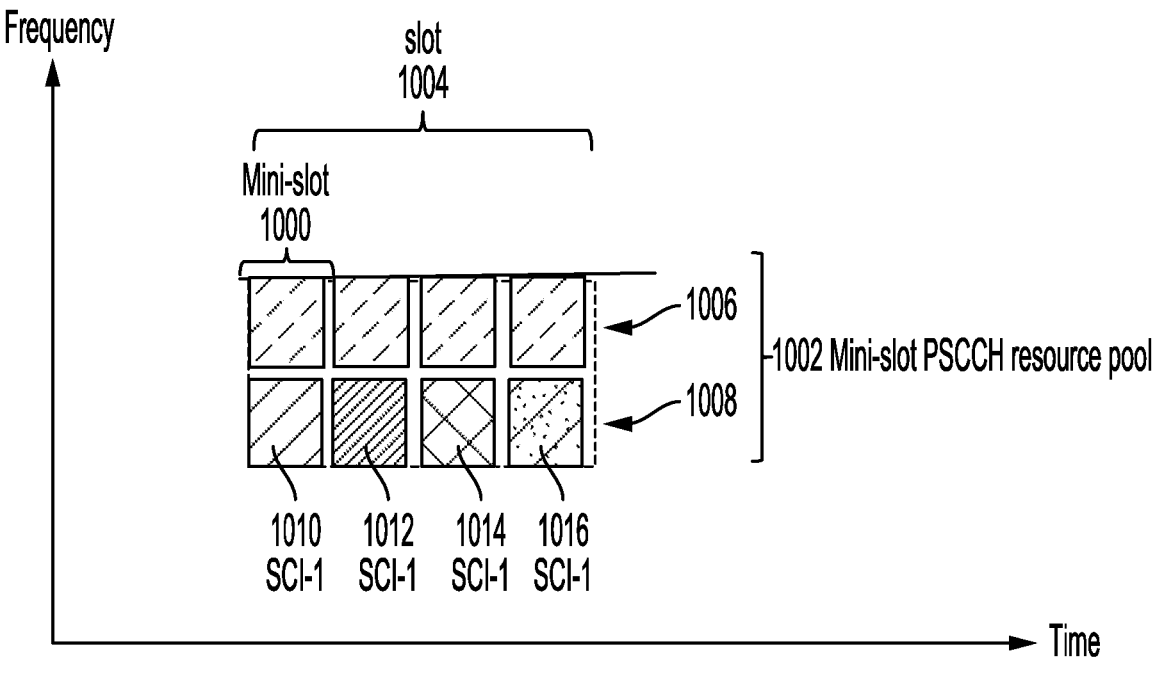
FIG. 10 is a block diagram illustrating an example of a dedicated physical sidelink control channel (PSCCH) resource pool, in accordance with various aspects of the present disclosure.

Aspects of the present disclosure define a dedicated resource pool for physical sidelink control channel (PSCCH) transmission, particularly SCI-1 transmission. The resource pool may contain multiple PSCCHs in time domain with a mini-slot structure. FIG. 10 is a block diagram illustrating an example of a dedicated PSCCH resource pool 1002, in accordance with aspects of the present disclosure. The dedicated PSCCH resource pool 1002 includes a slot 1004 having four mini-slots 1000. Although four mini-slots are shown, the number of mini-slots is not so limited. Each mini-slot 1000 is a potential PSCCH time domain resource. In the example of FIG. 10, four different transmitters each send an SCI-1 1010, 1012, 1014, 1016 in a different mini-slot 1000. The resource pool may contain multiple physical sidelink control channels (PSCCHs) (e.g., SCI-1s) in the frequency domain. The dedicated PSCCH resource pool 1002 in the example of FIG. 10 includes two subchannels 1006, 1008. Although two subchannels are shown, the number of subchannels is not so limited. In the example of FIG. 10, there are no SCI-1 transmissions in the first subchannel 1006.

Figure 11:
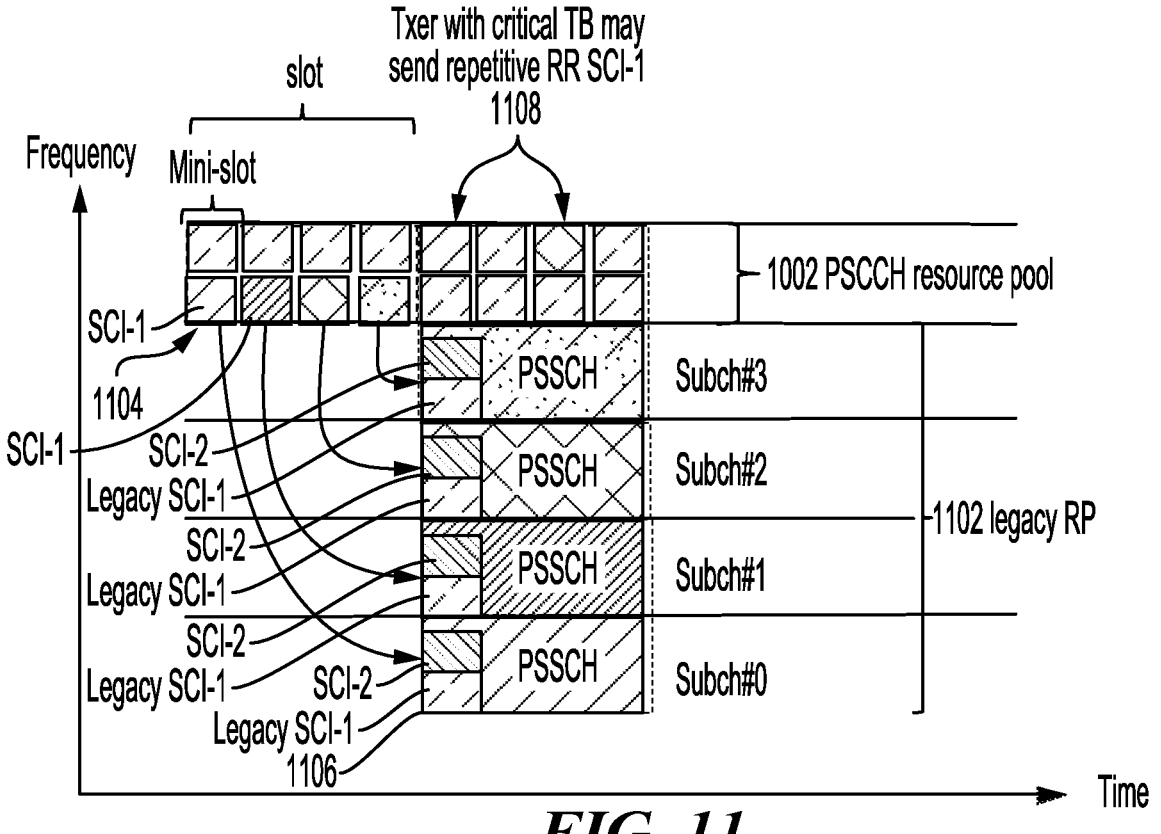
FIG. 11 is a block diagram illustrating an example of a dedicated PSCCH resource pool frequency division multiplexed with a data or legacy resource pool, in accordance with various aspects of the present disclosure.

FIG. 11 is a block diagram illustrating an example of a dedicated PSCCH resource pool 1002 frequency division multiplexed with a data or legacy resource pool 1102. The resource pool may contain multiple PSCCHs in time domain with a mini-slot structure. According to aspects of the present disclosure, a decoupled PSCCH (e.g., SCI-1) may schedule the PSSCH in a legacy resource pool 1102. For example, each SCI-1 may map to an SCI-2 and PSSCH in a different slot and subchannel. The SCI-1s are from the dedicated PSCCH resource pool 1002, whereas the SCI-2 and PSSCH are from a data or legacy resource pool 1102. In the example of FIG. 11, the legacy resource pool 1102 includes four subchannels, subchannel zero (Subch #0) through subchannel three (Subch #3). Different SCI-1s in different mini-slots map to different PSSCHs in different subchannels. For example, a first SCI-1 1104 maps to a first SCI-2 and PSSCH in subchannel zero. Second, third and fourth SCI-1s map to SCI-2s and PSSCHs in subchannels one through three, respectively. Transmitting SCI-1s for different subchannels within a single slot having a mini-slot structure reduces the chance that transmitters cannot hear each other's future resource reservation due to half duplex limitations. FIG. 11 shows frequency division multiplexing of the resource pools 1002, 1102. Frequency division multiplexing may further reduce scheduling delay.

Figure 12:
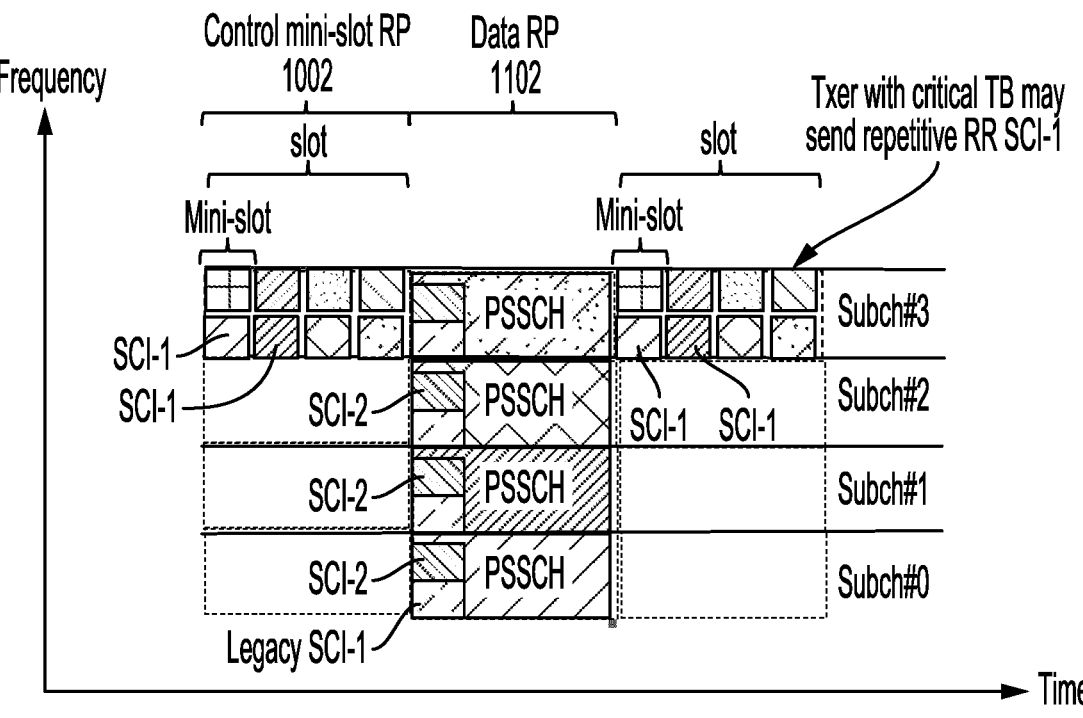
FIG. 12 is a block diagram illustrating an example of a dedicated PSCCH resource pool time division multiplexed with a data or legacy resource pool, in accordance with various aspects of the present disclosure.

Time division multiplexing is also possible, as seen in FIG. 12. FIG. 12 is a block diagram illustrating an example of a dedicated PSCCH resource pool 1002 time division multiplexed with a data or legacy resource pool 1102. For time division multiplexed resource pools, one type of pool (e.g., the dedicated PSCCH resource pool 1002) may occupy even numbered slots, while the other type of resource pool (e.g., the legacy resource pool 1102) may occupy odd numbered slots. Time division multiplexing may prevent coexistence issues between mini-slots and slots, for example, with respect to automatic gain control (AGC).

Because the mini-slot SCI-1s are time division multiplexed and map to different subchannels in the same slot, the transmitters have higher chances of hearing one another. Referring again to FIG. 11, if the network supports legacy UEs in the legacy resource pool 1102, a legacy SCI-1 1106 may be retained with consistent content as in the new SCI-1 1104 in the dedicated PSCCH resource pool 1002. Thus, legacy UEs can receive the same information without reading the new SCI-1 1104. In a greenfield deployment (e.g., without legacy UEs), the legacy PSCCH can be eliminated in front of the PSSCH. The UEs may rely on the mini-slot SCI-1 for channel sensing. In a mixed deployment of old and new UEs, the transmitter may still include the legacy PSCCH SCI-1 in front of the PSSCH. Keeping the legacy PSCCH SCI-1 enables legacy UEs to understand the resource reservations from the new UEs. In a mixed deployment, the new UEs may perform two-stage channel sensing, the first stage being for the mini-slot SCI-1 1104, and the second stage for the legacy SCI-1 1106. A transmitter with critical transport blocks (TBs) may send repetitive resource reservation SCI-1s 1108, as will be described in more detail below with respect to FIG. 13.

According to aspects of the present disclosure, time division multiplexing of SCI-1 transmissions may reduce the chance of a transmitter not being able to hear another transmitter's SCI-1 while transmitting. Utilizing the mini-slot structure to send the scheduling SCI-1 transmissions may reduce conflicts without sacrificing a transmission delay time. In aspects of the present disclosure, a mini-slot resource pool is dedicated for PSCCH transmission, particularly SCI-1 transmission. In these aspects, there are multiple PSSCHs in time domain with a mini-slot structure. The mini-slots may contain three or four symbols with the first symbol as automatic gain control (AGC) symbol and the last symbol as transmit/receive gap. The PSCCH may have a length of one or two symbols in the mini-slot structure. The resource pool may contain multiple potential PSCCH resources in the frequency domain. For example, the PSCCH subchannel size may be configured with X=10, 12, 15, 20, or 25 resource blocks (RBs) in the frequency domain. The dedicated resource pool may be configured with a multiple of X RBs (e.g., multiple PSCCH subchannels). The number of subchannels may depend on a configuration and bandwidth of the dedicated PSCCH resource pool.

According to aspects of the present disclosure, slot-based transmission for data and the PSSCH is based on the legacy slot-based resource pool. According to further aspects of the present disclosure, cross resource pool scheduling occurs. More specifically, a decoupled PSCCH from the dedicated mini-slot resource pool schedules a PSSCH in the data (or legacy) resource pool. The PSSCH scheduling SCI-1 is located in the dedicated control mini-slot resource pool in a first slot and the PSSCH is located in the data resource pool in a second slot. The PSCCH and the associated PSSCH are in different slots. A slot offset between the PSCCH and the scheduled PSSCH may be configured through radio resource control (RRC) signaling or an explicit SCI-1 field.

In aspects where the control mini-slot resource pool (RP) and data resource pool (RP) are frequency division multiplexed, the control mini-slot resource pool (RP) and data resource pool may correspond to different component carriers. For example, the control mini-slot resource pool may occupy a low band and the data resource pool may occupy a high band. The SCI-1 in the low band mini-slot control resource pool may include a transmission configuration indicator (TCI) state of the scheduled PSSCH and a beam reservation for future reserved resources.

Aspects of the present disclosure relate to mapping of the dedicated PSCCH resource pool to the data resource pool. In some aspects, mini-slots in the PSCCH resource pool map to different data subchannels in the data resource pool. There may be a one-to-one mapping from SCI-1 mini-slots to subchannels. Mini-slot SCI-1 mapping to different data subchannels in the same slot may be time division multiplexed within the dedicated PSCCH resource pool. Thus, transmitters have a higher chance of hearing one another, assuming they are not colliding on the same resource (e.g., subchannel). An SCI-1 mini-slot resource index where the SCI-1 is detected may determine a starting subchannel of the PSSCH in the data resource pool. For example, the first mini-slot may correspond to the first subchannel. The number of subchannels may be signaled in the mini-slot SCI-1.

According to aspects of the present disclosure, a new format is presented for the decoupled SCI-1 and PSSCH design. The mini-slot SCI-1 may include additional fields for a layer one (L1) source identifier (ID), an L1 destination ID, a TCI state, and a slot offset (K0). The TCI state may help with low band/high band operation. The SCI-1 is decoupled from the PSSCH. In other words, they are in different slots and possibly in different carriers. As a result, it is beneficial for the receiver to know if the PSSCH is intended for itself. The L1 destination ID may help the receiver determine whether to decode the PSSCH in the data resource pool. The L1 source ID may help with determining the physical sidelink feedback channel (PSFCH) resource. For example, the transmitter and receiver may perform hand shaking before actual PSSCH transmission via the mini-slot PSFCH to avoid collision. The TCI state in the SCI-1 indicates the PSSCH beam. For example, the SCI-1 and PSSCH may be transmitted with different beams. The slot offset (K0) from the mini-slot SCI-1 to the scheduled PSSCH may optionally be included in the SCI-1 message.

As mentioned above, the dedicated PSCCH resource pool may accommodate repetitive resource reservation SCI-1 messages. The transmitter may repeat the legacy SCI-1 in a dedicated mini-slot resource pool to solve possible collisions in the future reserved resources due to the half duplex deafness problem. The repetitive resource reservation SCI-1 design may improve the robustness of future resource reservations.

Figure 13:
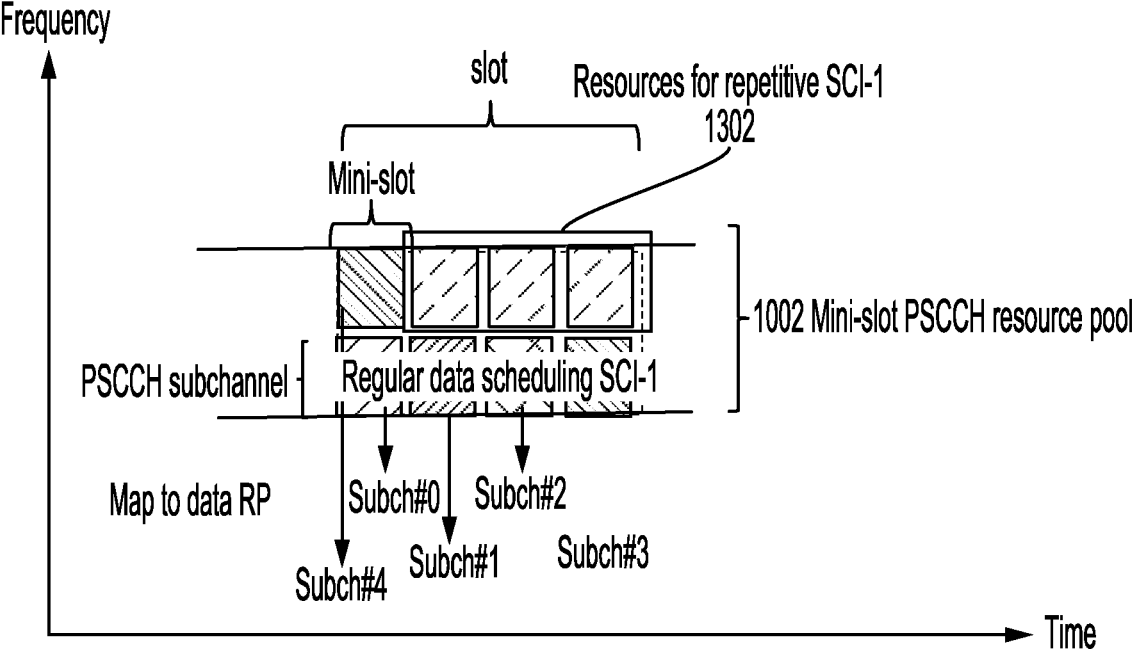
FIG. 13 is a block diagram illustrating an example of repetitive resource reservation, in accordance with various aspects of the present disclosure.

FIG. 13 is a block diagram illustrating an example of repetitive resource reservation, in accordance with aspects of the present disclosure. In the example of FIG. 13, five mini-slots from the dedicated PSCCH resource pool 1002 are allocated to five different SCI-1 messages from five different transmitters. The dedicated PSCCH resource pool 1002 is allocated for regular SCI-1 messages first in time (e.g., mini-slots) and second in frequency (e.g., PSCCH subchannels 1302). These five mini-slots are allocated to five different data subchannels (subch #0 through subch #4) in the data resource pool. The regular SCI-1 message allocated to subchannel zero is first in time, followed by the regular SCI-1 message allocated to subchannel one, followed by the regular SCI-1 message allocated to subchannel two, followed by the regular SCI-1 message allocated to subchannel three. The fifth regular SCI-1 message allocated to subchannel four is in the first mini-slot of the second subchannel. The remaining mini-slots and PSCCH subchannels 1302 of the dedicated PSCCH resource pool 1002 are available for repetitive resource reservation SCI-1 messages. The resource assignment for repetitive resource reservation SCI-1 messages may be based on hashing function of a sidelink ID, for example.

The resource reservation time domain resource allocation or frequency domain resource allocation (TDRA/FDRA) in a mini-slot SCI-1 message is for the data resource pool. That is, the TDRA/FDRA fields indicate the future reserved resources in the data resource pool. According to aspects of the present disclosure, the reference slot may be the first PSSCH slot scheduled by the mini-slot SCI-1. In a greenfield deployment, the receiver may not decode the data resource pool if the destination ID does not match the receiver ID.

In other aspects, the new UEs may perform channel sensing based on mini-slot SCI-1 messages in the mini-slot control resource pool. Reading the mini-slot SCI-1 message is sufficient to handle the reservation and collision from the new UEs. In a mixed deployment, additional second stage sensing occurs based on the legacy SCI-1 message in the data resource pool. The second stage sensing may help to resolve reservations and collisions from the legacy UEs.

As indicated above, FIGS. 3-13 are provided as examples. Other examples may differ from what is described with respect to FIGS. 3-13.

FIG. 14 is a flow diagram illustrating an example process 1400 performed, for example, by a user equipment (UE), in accordance with various aspects of the present disclosure. The example process 1400 is an example of decoupled mini-slot first stage sidelink control information (SCI-1) for scheduling and resource reservation.

At block 1402, the user equipment (UE) selects a resource from a dedicated physical sidelink control channel (PSCCH) resource pool having multiple potential PSCCH time domain resources with a mini-slot structure. For example, the UE (e.g. using the controller/processor 359, and/or memory 360) may select the resource. In some aspects, the dedicated PSCCH resource pool comprises a second set of potential PSCCH time domain resources in a second frequency domain different from a first frequency domain of the first potential PSCCH time domain resources. In some aspects, the mini-slot SCI-1 message is in a first slot and the PSSCH is in a second slot, different from the first slot. The dedicated PSCCH resource pool may frequency division multiplexed with the data resource pool and/or time division multiplexed with the data resource pool. The dedicated PSCCH resource pool may be in a first component carrier (CC) different from a second CC of the data resource pool. In some aspects, each mini-slot in the dedicated PSCCH resource pool maps to a different subchannel in the data resource pool.

At block 1404 the user equipment (UE) transmits a mini-slot first stage sidelink control information (SCI-1) message on the selected resource. The mini-slot SCI-1 message is decoupled from a physical sidelink shared channel (PSSCH) associated with a data resource pool. For example, the UE (e.g. using the antenna 352, transmitter 354, transmit processor 368, controller/processor 359, and/or memory 360) may transmit the information. In some aspects, the mini-slot SCI-1 message includes a field for at least one of a layer one (L1) source identifier (ID), a L1 destination ID, a transmission configuration indicator (TCI state), or a slot offset value (K0). The UE may transmit a repeated resource reservation SCI-1 message in a subsequent selected resource of the dedicated PSCCH resource pool.

EXAMPLE ASPECTS

Aspect 1: A method of wireless communication, by a user equipment (UE), comprising: selecting a resource from a dedicated physical sidelink control channel (PSCCH) resource pool having a first plurality of potential PSCCH time domain resources with a mini-slot structure; and transmitting a mini-slot first stage sidelink control information (SCI-1) message on the selected resource, the mini-slot SCI-1 message decoupled from a physical sidelink shared channel (PSSCH) associated with a data resource pool.

Aspect 2: The method of Aspect 1, in which the dedicated PSCCH resource pool comprises a second plurality of potential PSCCH time domain resources in a second frequency domain different from a first frequency domain of the first plurality of potential PSCCH time domain resources.

Aspect 3: The method of Aspect 1 or 2, in which the mini-slot SCI-1 message is in a first slot and the PSSCH is in a second slot, different from the first slot.

Aspect 4: The method of any of the preceding Aspects, further comprising: sensing in the first slot for the mini-slot SCI-1 message; and sensing in the second slot for a legacy SCI-1 message.

Aspect 5: The method of any of the preceding Aspects, further comprising receiving an indication of an offset between the first slot and the second slot.

Aspect 6: The method of any of the preceding Aspects, in which the dedicated PSCCH resource pool is frequency division multiplexed with the data resource pool.

Aspect 7: The method of any of the preceding Aspects, in which the dedicated PSCCH resource pool is time division multiplexed with the data resource pool.

Aspect 8: The method of any of the preceding Aspects, in which the dedicated PSCCH resource pool is in a first component carrier (CC) different from a second CC of the data resource pool.

Aspect 9: The method of any of the preceding Aspects, in which each mini-slot in the dedicated PSCCH resource pool maps to a different subchannel in the data resource pool.

Aspect 10: The method of any of the preceding Aspects, in which the mini-slot SCI-1 message includes a field for at least one of a layer one (L1) source identifier (ID), a L1 destination ID, a transmission configuration indicator (TCI state), or a slot offset value (K0).

Aspect 11: The method of any of the preceding Aspects, further comprising transmitting a repeated resource reservation SCI-1 message in a subsequent selected resource of the dedicated PSCCH resource pool.

Aspect 12: The method of any of the preceding Aspects, in which a resource reservation resource allocation within the mini-slot SCI-1 message is with respect to a first scheduled PSSCH slot of the data resource pool.

Aspect 13: The method of any of the preceding Aspects, further comprising performing channel sensing based on another mini-slot SCI-1 message of the dedicated PSCCH resource pool, which is received from a first transmitter.

Aspect 14: The method of any of the preceding Aspects, further comprising performing second stage channel sensing based on a legacy SCI-1 message of the data resource pool, the legacy SCI-1 message received from a second transmitter.

Aspect 15: An apparatus for wireless communication, by a user equipment (UE), comprising: a memory; and at least one processor coupled to the memory, the at least one processor configured: to select a resource from a dedicated physical sidelink control channel (PSCCH) resource pool having a first plurality of potential PSCCH time domain resources with a mini-slot structure; and to transmit a mini-slot first stage sidelink control information (SCI-1) message on the selected resource, the mini-slot SCI-1 message decoupled from a physical sidelink shared channel (PSSCH) associated with a data resource pool.

Aspect 16: The apparatus of Aspect 15, in which the dedicated PSCCH resource pool comprises a second plurality of potential PSCCH time domain resources in a second frequency domain different from a first frequency domain of the first plurality of potential PSCCH time domain resources.

Aspect 17: The apparatus of Aspects 15 or 16, in which the mini-slot SCI-1 message is in a first slot and the PSSCH is in a second slot, different from the first slot.

Aspect 18: The apparatus of any of the Aspects 15-17, in which the at least one processor is further configured: to sense in the first slot for the mini-slot SCI-1 message; and to sense in the second slot for a legacy SCI-1 message.

Aspect 19: The apparatus of any of the Aspects 15-18, in which the at least one processor is further configured to receive an indication of an offset between the first slot and the second slot.

Aspect 20: The apparatus of any of the Aspects 15-19, in which the dedicated PSCCH resource pool is frequency division multiplexed with the data resource pool.

Aspect 21: The apparatus of any of the Aspects 15-20, in which the dedicated PSCCH resource pool is time division multiplexed with the data resource pool.

Aspect 22: The apparatus of any of the Aspects 15-21, in which the dedicated PSCCH resource pool is in a first component carrier (CC) different from a second CC of the data resource pool.

Aspect 23: The apparatus of any of the Aspects 15-22, in which each mini-slot in the dedicated PSCCH resource pool maps to a different subchannel in the data resource pool.

Aspect 24: The apparatus of any of the Aspects 15-23, in which the mini-slot SCI-1 message includes a field for at least one of a layer one (L1) source identifier (ID), a L1 destination ID, a transmission configuration indicator (TCI state), or a slot offset value (K0).

Aspect 25: The apparatus of any of the Aspects 15-24, in which the at least one processor is further configured to transmit a repeated resource reservation SCI-1 message in a subsequent selected resource of the dedicated PSCCH resource pool.

Aspect 26: The apparatus of any of the Aspects 15-25, in which a resource reservation resource allocation within the mini-slot SCI-1 message is with respect to a first scheduled PSSCH slot of the data resource pool.

Aspect 27: The apparatus of any of the Aspects 15-26, in which the at least one processor is further configured to perform channel sensing based on another mini-slot SCI-1 message of the dedicated PSCCH resource pool, which is received from a first transmitter.

Aspect 28: The apparatus of any of the Aspects 15-27, in which the at least one processor is further configured to perform second stage channel sensing based on a legacy SCI-1 message of the data resource pool, the legacy SCI-1 message received from a second transmitter.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a user equipment (UE), comprising:
   selecting a resource from a dedicated physical sidelink control channel (PSCCH) resource pool having a first plurality of potential PSCCH time domain resources with a mini-slot structure, wherein the dedicated PSCCH resource pool is in a first component carrier (CC) different from a second CC of the data resource pool; and
   transmitting a mini-slot first stage sidelink control information (SCI-1) message on the selected resource, the mini-slot SCI-1 message decoupled from a physical sidelink shared channel (PSSCH) associated with a data resource pool.

2. The method of claim 1, in which the dedicated PSCCH resource pool comprises a second plurality of potential PSCCH time domain resources in a second frequency domain different from a first frequency domain of the first plurality of potential PSCCH time domain resources.

3. The method of claim 1, in which the mini-slot SCI-1 message is in a first slot and the PSSCH is in a second slot, different from the first slot.

4. The method of claim 3, further comprising:
   sensing in the first slot for the mini-slot SCI-1 message; and
   sensing in the second slot for a legacy SCI-1 message.

5. The method of claim 3, further comprising receiving an indication of an offset between the first slot and the second slot.

6. The method of claim 1, in which the dedicated PSCCH resource pool is frequency division multiplexed with the data resource pool.

7. The method of claim 1, in which the dedicated PSCCH resource pool is time division multiplexed with the data resource pool.

8. The method of claim 1, in which each mini-slot in the dedicated PSCCH resource pool maps to a different subchannel in the data resource pool.

9. The method of claim 1, in which the mini-slot SCI-1 message includes a field for at least one of a layer one (L1) source identifier (ID), a L1 destination ID, a transmission configuration indicator (TCI state), or a slot offset value (K0).

10. The method of claim 1, further comprising transmitting a repeated resource reservation SCI-1 message in a subsequent selected resource of the dedicated PSCCH resource pool.

11. The method of claim 1, in which a resource reservation resource allocation within the mini-slot SCI-1 message is with respect to a first scheduled PSSCH slot of the data resource pool.

12. The method of claim 1, further comprising performing channel sensing based on another mini-slot SCI-1 message of the dedicated PSCCH resource pool, which is received from a first transmitter.

13. The method of claim 12, further comprising performing second stage channel sensing based on a legacy SCI-1 message of the data resource pool, the legacy SCI-1 message received from a second transmitter.

14. An apparatus for wireless communication, by a user equipment (UE), comprising:
a memory; and
at least one processor coupled to the memory, the at least one processor configured:
to select a resource from a dedicated physical sidelink control channel (PSCCH) resource pool having a first plurality of potential PSCCH time domain resources with a mini-slot structure, wherein the dedicated PSCCH resource pool is in a first component carrier (CC) different from a second CC of the data resource pool; and
to transmit a mini-slot first stage sidelink control information (SCI-1) message on the selected resource, the mini-slot SCI-1 message decoupled from a physical sidelink shared channel (PSSCH) associated with a data resource pool.

15. The apparatus of claim 14, in which the dedicated PSCCH resource pool comprises a second plurality of potential PSCCH time domain resources in a second frequency domain different from a first frequency domain of the first plurality of potential PSCCH time domain resources.

16. The apparatus of claim 14, in which the mini-slot SCI-1 message is in a first slot and the PSSCH is in a second slot, different from the first slot.

17. The apparatus of claim 16, in which the at least one processor is further configured:
to sense in the first slot for the mini-slot SCI-1 message; and
to sense in the second slot for a legacy SCI-1 message.

18. The apparatus of claim 16, in which the at least one processor is further configured to receive an indication of an offset between the first slot and the second slot.

19. The apparatus of claim 14, in which the dedicated PSCCH resource pool is frequency division multiplexed with the data resource pool.

20. The apparatus of claim 14, in which the dedicated PSCCH resource pool is time division multiplexed with the data resource pool.

21. The apparatus of claim 14, in which each mini-slot in the dedicated PSCCH resource pool maps to a different subchannel in the data resource pool.

22. The apparatus of claim 14, in which the mini-slot SCI-1 message includes a field for at least one of a layer one (L1) source identifier (ID), a L1 destination ID, a transmission configuration indicator (TCI state), or a slot offset value (K0).

23. The apparatus of claim 14, in which the at least one processor is further configured to transmit a repeated resource reservation SCI-1 message in a subsequent selected resource of the dedicated PSCCH resource pool.

24. The apparatus of claim 14, in which a resource reservation resource allocation within the mini-slot SCI-1 message is with respect to a first scheduled PSSCH slot of the data resource pool.

25. The apparatus of claim 14, in which the at least one processor is further configured to perform channel sensing based on another mini-slot SCI-1 message of the dedicated PSCCH resource pool, which is received from a first transmitter.

26. The apparatus of claim 25, in which the at least one processor is further configured to perform second stage channel sensing based on a legacy SCI-1 message of the data resource pool, the legacy SCI-1 message received from a second transmitter.

27. An apparatus for wireless communication, by a user equipment (UE), comprising:
means for selecting a resource from a dedicated physical sidelink control channel (PSCCH) resource pool having a first plurality of potential PSCCH time domain resources with a mini-slot structure, wherein the dedicated PSCCH resource pool is in a first component carrier (CC) different from a second CC of the data resource pool; and
means for transmitting a mini-slot first stage sidelink control information (SCI-1) message on the selected resource, the mini-slot SCI-1 message decoupled from a physical sidelink shared channel (PSSCH) associated with a data resource pool.

28. The apparatus of claim 27, in which the dedicated PSCCH resource pool comprises a second plurality of potential PSCCH time domain resources in a second frequency domain different from a first frequency domain of the first plurality of potential PSCCH time domain resources.

* * * * *